(12) United States Patent
Kojima et al.

(10) Patent No.: US 10,274,220 B2
(45) Date of Patent: Apr. 30, 2019

(54) INDOOR UNIT OF AIR CONDITIONER

(71) Applicant: DAIKIN INDUSTRIES, LTD., Osaka-shi, Osaka (JP)

(72) Inventors: Nobuyuki Kojima, Osaka (JP); Akira Komatsu, Osaka (JP); Ryouta Suhara, Osaka (JP); Masaaki Murata, Osaka (JP); Natsumi Furo, Osaka (JP)

(73) Assignee: DAIKIN INDUSTRIES, LTD., Osaka-Shi, Osaka ( * ) Notice: Subject to any disclaimer, the term of this patent is extended or adjusted under 35 U.S.C. 154(b) by 0 days.

(21) Appl. No.: 15/758,516

(22) PCT Filed: Aug. 2, 2016

(86) PCT No.: PCT/JP2016/003566
§ 371 (c)(1),
(2) Date: Mar. 8, 2018

(87) PCT Pub. No.: WO2017/056361
PCT Pub. Date: Apr. 6, 2017

(65) Prior Publication Data
US 2018/0259217 A1    Sep. 13, 2018

(30) Foreign Application Priority Data

Sep. 29, 2015 (JP) .................................. 2015-192073

(51) Int. Cl.
*F24F 11/79* (2018.01)
*F24F 11/77* (2018.01)
(Continued)

(52) U.S. Cl.
CPC ............ *F24F 11/79* (2018.01); *F24F 1/0014* (2013.01); *F24F 1/0047* (2019.02); *F24F 11/77* (2018.01);
(Continued)

(58) Field of Classification Search
CPC .................................. F24F 11/79; F24F 11/89
(Continued)

(56) References Cited

U.S. PATENT DOCUMENTS 5,810,661 A * 9/1998 Bang ..................... F24F 11/79
454/286
8,655,489 B2 * 2/2014 Horiuchi .................. F24F 11/56
700/276
(Continued)

FOREIGN PATENT DOCUMENTS

EP         2913600 A1     9/2015
EP         2918931 A1     9/2015
(Continued)

OTHER PUBLICATIONS

International Search Report for PCT/JP2016/003566 (PCT/ISA/210) dated Oct. 25, 2016.

*Primary Examiner* — Kenneth Rinehart
*Assistant Examiner* — Phillip Decker
(74) *Attorney, Agent, or Firm* — Birch, Stewart, Kolasch & Birch, LLP

(57) ABSTRACT

If a load of an indoor space is higher than a predetermined value in a cooling operation, a controller performs a swing control operation to swing a wind direction adjusting slat so that a direction of blown air shifts in a limited possible range. The angle of a lowermost wind direction relative to a horizontal plane in the limited possible range is smaller than the angle of a lowermost wind direction relative to the horizontal plane in the normal possible range. The normal possible range is previously determined to be a range where if the load of the indoor space is lower than the predetermined value, the direction of the blown air can shift upward and downward.

9 Claims, 10 Drawing Sheets

(51) Int. Cl.
*F24F 1/00* (2019.01)
*F24F 1/0047* (2019.01)
*F24F 11/89* (2018.01)
*F24F 1/0014* (2019.01)
*F24F 140/50* (2018.01)
*F24F 1/0022* (2019.01)

(52) U.S. Cl.
CPC ............ *F24F 11/89* (2018.01); *F24F 1/0022* (2013.01); *F24F 2140/50* (2018.01)

(58) Field of Classification Search
USPC ........................................................ 454/229
See application file for complete search history.

(56) References Cited

U.S. PATENT DOCUMENTS

| | | | | |
|---|---|---|---|---|
| 8,973,845 | B2* | 3/2015 | Kanaya | F24F 1/0014 236/49.3 |
| 2006/0286923 | A1* | 12/2006 | Oka | F24F 1/0011 454/259 |
| 2012/0174608 | A1* | 7/2012 | Kumamoto | F24F 1/0011 62/186 |
| 2012/0220212 | A1* | 8/2012 | Tsuji | F24F 11/30 454/333 |
| 2012/0225618 | A1* | 9/2012 | Nouchi | F24F 1/0011 454/258 |
| 2012/0288363 | A1* | 11/2012 | Yumoto | F24F 1/0014 415/182.1 |
| 2014/0020860 | A1* | 1/2014 | Matsumoto | F24F 1/0007 165/11.1 |
| 2014/0315482 | A1* | 10/2014 | Yasutomi | F24F 1/0011 454/338 |
| 2015/0153063 | A1* | 6/2015 | Yasutomi | F24F 1/0011 454/241 |
| 2015/0354850 | A1* | 12/2015 | Iwano | F24F 13/15 454/256 |
| 2017/0089605 | A1* | 3/2017 | Kim | F24F 1/0011 |
| 2017/0276392 | A1* | 9/2017 | Komatsu | F24F 11/89 |
| 2017/0292732 | A1* | 10/2017 | Kojima | F24F 11/89 |
| 2018/0252429 | A1* | 9/2018 | Kojima | F24F 11/89 |
| 2018/0299164 | A1* | 10/2018 | Suhara | F24F 11/79 |

FOREIGN PATENT DOCUMENTS

| | | | | |
|---|---|---|---|---|
| JP | 62-276353 | A | 12/1987 | |
| JP | 02-282645 | A | 11/1990 | |
| JP | 2001-116323 | A | 4/2001 | |
| JP | 2003-74955 | A | 3/2003 | |
| JP | 2005-16885 | A | 1/2005 | |
| JP | 2005-134051 | A | 5/2005 | |
| JP | 2007-218564 | A | 8/2007 | |
| JP | 2008-215721 | A | 9/2008 | |
| JP | 2009-145008 | A | 7/2009 | |
| JP | 2009-198066 | A | 9/2009 | |
| JP | 2011-069592 | A | 4/2011 | |
| WO | WO-2013084751 | A1* | 6/2013 | ............ F24F 13/14 |

* cited by examiner (a) BASIC BLOWOUT MODE (c) SECOND BLOWOUT MODE (b) FIRST BLOWOUT MODE

INDOOR UNIT OF AIR CONDITIONER

TECHNICAL FIELD

The present disclosure relates to an indoor unit of an air conditioner.

BACKGROUND ART

Air conditioner indoor units known in the art blow air (temperature-adjusted air) into an indoor space. Patent Document 1 and other documents disclose an indoor unit of this type. The indoor unit of Patent Document 1 includes a plurality of louvers (wind direction adjusting slats) arranged side by side at its outlet (outlet opening). The louvers are repeatedly turned upward and downward within the largest possible range to improve the air impelling performance and comfort.

CITATION LIST

Patent Documents

[Patent Document 1] Japanese Unexamined Patent Publication No. 2003-74955

SUMMARY OF THE INVENTION

Technical Problem

If a load of an indoor space is high in a cooling operation, it is recommended that to reduce the amount of variation in temperature among areas of the indoor space and the load of the indoor space, air blown out of an outlet opening of an indoor unit be distributed over the indoor space to widely cool the indoor space. Unfortunately, the (cooled) air blown out of the outlet opening of the indoor unit in the cooling operation tends to flow downward of the outlet opening by gravitation. For this reason, even if a wind direction adjusting slat disposed at the outlet opening is swung (reciprocated) so that the direction of the air blown out of the outlet opening of the indoor unit in the cooling operation shifts (reciprocates) upward and downward within a predetermined possible range, the air blown out of the outlet opening is hardly distributed over the indoor space. This makes it difficult to reduce the amount of variation in temperature among areas of the indoor space and the load of the indoor space.

It is therefore an object of the present disclosure to provide an air conditioner indoor unit which can reduce the amount of variation in temperature among areas of an indoor space and the load of the indoor space in a cooling operation.

Solution to the Problem

A first aspect of the disclosure is directed to an air conditioner indoor unit blowing air into an indoor space (500). The unit includes: a casing (20) having at least one outlet opening (24a to 24d); a wind direction adjusting slat (51) provided at the at least one outlet opening (24a to 24d) to shift a direction of blown air through the at least one outlet opening (24a to 24d) upward and downward; and a controller (90) configured to perform a swing control operation if a load of the indoor space (500) is higher than a predetermined value in a cooling operation, the swing control operation being performed to swing the wind direction adjusting slat (51) so that the direction of the blown air shifts in a limited possible range (R2) where an angle of a lowermost wind direction relative to a horizontal plane is smaller than an angle of a lowermost wind direction relative to the horizontal plane in a normal possible range (R1), the normal possible range (R1) being previously determined to be a range where if the load of the indoor space (500) is lower than the predetermined value in the cooling operation, the direction of the blown air can shift upward and downward.

In the first aspect, if the load of the indoor space (500) is higher than the predetermined value, the swing control operation is performed. This can reduce the angle of the lowermost wind direction (relative to the horizontal plane) in a range where the direction of the blown air swings (the range where the direction of the blown air shifts upward and downward). This can make it less likely for the blown air to flow downward of the outlet opening (24a to 24d) than if the direction of the blown air is shifted in the normal possible range (R1) during the cooling operation. This allows the blown air to be distributed over the indoor space (500) to widely cool the indoor space (500). This can reduce the amount of variation in temperature among areas of the indoor space (500) and the load of the indoor space (500) in the cooling operation.

A second aspect of the disclosure is an embodiment of the first aspect. In the second aspect, an uppermost wind direction in the limited possible range (R2) may be set to be a direction of the blown air directed horizontally.

In the second aspect, defining the uppermost wind direction in the limited possible range (R2) as the direction of the blown air directed horizontally can facilitate blowing air through the outlet opening (24a to 24d) toward a distant location in the horizontal direction. This can increase the distance over which the blown air travels in the horizontal direction, thus distributing the blown air over a wide range of the indoor space (500).

A third aspect of the disclosure is an embodiment of the first or second aspect. In the third aspect, in the swing control operation, the controller (90) may swing the wind direction adjusting slat (51) so that the direction of the blown air in the limited possible range (R2) shifts in a predetermined pattern.

In the third aspect, the controller (90) is configured to swing the wind direction adjusting slat (51) so that in the swing control operation, the direction of the blown air shifts in the predetermined pattern. Thus, the pattern in which the direction of the blown air shifts in the swing control operation can be optionally set. Thus, the pattern in which the direction of the blown air shifts can be set such that during the period of a cycle in which the blown air swings (the period of time that it takes for the direction of the blown air to reciprocate once within the limited possible range (R2)), the period during which the direction of the blown air is located in a relatively upper region of the limited possible range (R2) (hereinafter referred to as the "upper blowout period") is longer than the period during which the direction of the blown air is located in a relatively lower region of the limited possible range (R2) (hereinafter referred to as the "lower blowout period"). This can make it less likely for the blown air to flow downward of the outlet opening (24a-24d), thus distributing the blown air over a wide range of the indoor space (500).

A fourth aspect of the disclosure is an embodiment of the first or second aspect. In the fourth aspect, the casing (20) may have the at least one outlet opening (24a to 24d) comprising a plurality of outlet openings. The wind direction adjusting slat (51) may be provided at each of the outlet openings (24a to 24d). In the swing control operation, the controller (90) may swing the wind direction adjusting slats (51) each provided at an associated one of the outlet openings (24a to 24d) so that the direction of the blown air through each of the main outlet openings (24a to 24d) shifts in the limited possible range (R2).

In the fourth aspect, the casing (20) having the multiple outlet openings (24a to 24d) can increase the number of outlets for blown air. Thus, the blown air can be distributed over a wide range of the indoor space (500).

A fifth aspect of the disclosure is an embodiment of the fourth aspect. In the fifth aspect, in the swing control operation, the controller (90) may swing the wind direction adjusting slats (51) each provided at an associated one of the outlet openings (24a to 24d) so that the directions of the blown air through the main outlet openings (24a to 24d) shift in respective patterns, the respective patterns being each previously determined for an associated one of the outlet openings (24a to 24d).

In the fifth aspect, the controller (90) is configured to swing the wind direction adjusting slats (51) so that in the swing control operation, the direction of the blown air shifts in respective patterns, which are each previously determined for an associated one of the outlet openings (24a to 24d). Thus, the pattern in which the direction of the blown air shifts in the swing control operation can be optionally set for each of the outlet openings (24a to 24d). Thus, the pattern in which the direction of air blown through each of the outlet openings (24a to 24d) shifts can be set such that during, the period of the cycle in which the blown air swings, the upper blowout period is longer than the lower blowout period. Such settings can make it less likely for the blown air to flow downward of the outlet openings (24a to 24d). This allows the blown air to be distributed over a wide range of the indoor space (500).

A sixth aspect of the disclosure is an embodiment of the fourth or fifth aspect. In the sixth aspect, the air conditioner indoor unit may further include an air current blocking mechanism (50) provided at each of the outlet openings (24a to 24d) to block a current of air through the outlet opening (24a to 24d). The controller (90) performs an air current control operation if the load of the indoor space (500) is higher than the predetermined value in the cooling operation, the air current control operation being performed to control the air current blocking mechanisms (50) so that a current of air through at least one of the outlet openings (24a to 24d) is blocked by the associated air current blocking mechanism (50) to increase a velocity of the blown air through the remaining outlet opening (24a to 24d).

In the sixth aspect, if the load of the indoor space (500) is higher than the predetermined value, the air current control operation is performed. This can increase the velocity of air blown through the outlet openings (24a to 24d) at which the air current blocking mechanisms (50) do not block a current of air. This can facilitate blowing air through the outlet openings (24a to 24d) at which the air current blocking mechanisms (50) do not block the current of air toward a distant location in the horizontal direction. This can increase the distance over which the blown air travels in the horizontal direction, thus distributing the blown air over a wide range of the indoor space (500).

A seventh aspect of the disclosure is an embodiment of the sixth aspect. In the seventh aspect, at least one of the outlet openings (24a to 24d) may constitute a first opening (24X), the remaining outlet opening (24a to 24d) may constitute a second opening (24Y), and In the air current control operation, the controller (90) may switch between a first blowout mode and a second blowout mode, an operation in the first blowout mode being performed to block a current of air through the first opening (24X) with an associated one of the air current blocking mechanisms (50) to increase a velocity of blown air through the second opening (24Y), an operation in the second blowout mode being performed to block a current of air through the second opening with an associated one of the air current blocking mechanisms (50) to increase a velocity of blown air through the first opening.

In the seventh aspect, the air current control operation is performed while switching is made between first and second blowout modes, thereby distributing blown air over a wider range of the indoor space (500) than if outlets for the blown air are fixed (i.e., if an operation is performed in only either the first or second blowout mode).

An eighth aspect of the disclosure is an embodiment of the seventh aspect. In the eighth aspect, in the air current control operation, the controller (90) may switch among the first blowout mode, the second blowout mode, and a basic blowout mode, and may perform the swing control operation together with the operation in the basic blowout mode, an operation in the basic blowout mode being performed to supply air into the indoor space (500) through the first and second openings (24X) and (24Y).

In the eighth aspect, the air current control operation is performed while switching is made among the basic blowout mode, the first blowout mode, and the second blowout mode. This allows the blown air to be supplied to a region relatively close to the indoor unit in the basic blowout mode and to be supplied to a region relatively far from the indoor unit in the first and second blowout modes. Thus, the blown air can be distributed over a wide range of the indoor space (500).

A ninth aspect of the disclosure is an embodiment of any one of the sixth through eighth aspects. In the ninth aspect, the wind direction adjusting slats (51) may be each capable of shifting to a position to block a current of air through an associated one of the outlet openings (24a to 24d), and may serve also as the air current blocking mechanisms (50).

In the ninth aspect, the wind direction adjusting slats (51) serve also as the air current blocking mechanisms (50).

A tenth aspect of the disclosure is an embodiment of any one of the fourth through ninth aspects. In the tenth aspect, an opening adjusting mechanism (55) may be provided at each of the outlet openings (24a to 24d) to adjust an area of the outlet opening (24a to 24d), and the controller (90) may perform an opening control operation if the load of the indoor space (500) is higher than the predetermined value in the cooling operation, the opening control operation being performed to control the opening adjusting mechanism (55) provided at at least one of the outlet openings (24a to 24d) so that an area of the at least one of the outlet openings (24a to 24d) is smaller than a normal opening area to increase a velocity of blown air through the at least one of the outlet openings (24a to 24d), the normal opening area being previously determined to be an area of the at least one of the outlet openings (24a to 24d) obtained if the load of the indoor space (500) is lower than the predetermined value.

In the tenth aspect, if the load of the indoor space (500) is higher than the predetermined value, the opening control operation is performed. This can increase the velocity of the blown air through the outlet openings (24a to 24d) each having an area reduced by the opening adjusting mechanism (55) to be smaller than the normal opening area. This can facilitate blowing air through the outlet openings (the outlet openings (24a to 24d) each having an area reduced by the opening adjusting mechanism (55) to be smaller than the normal opening area) toward a distant location in the horizontal direction. This can increase the distance over which the blown air travels in the horizontal direction, thus distributing the blown air over a wide range of the indoor space (500).

An eleventh aspect of the disclosure is an embodiment of any one of the first through tenth aspects. The unit of any one of the first through tenth aspects of the disclosure may further include: an indoor fan (31) housed in the casing (20) to generate a current of the blown air through the at least one outlet opening (24a to 24d). The controller (90) may perform a fan control operation if the load of the indoor space (500) is higher than the predetermined value in the cooling operation, the fan control operation being performed to control the indoor fan (31) so that a velocity of the blown air is higher than a normal air velocity, the normal air velocity being previously determined to be a velocity of the blown air obtained if the load of the indoor space (500) is lower than the predetermined value.

In the eleventh aspect, if the load of the indoor space (500) is higher than the predetermined value, the fan control operation is performed. This can increase the velocity of the blown air through the outlet openings (24a to 24d). This can increase the distance over which the blown air travels in the horizontal direction, thus distributing the blown air over a wide range of the indoor space (500).

A twelfth aspect of the disclosure is directed to an air conditioner indoor unit blowing air into an indoor space (500). The unit includes: a casing having at least one outlet opening (24a to 24d); a wind direction adjusting slat (51) provided at the at least one outlet opening (24a to 24d) to shift a direction of blown air through the at least one outlet opening (24a to 24d) upward and downward; and a controller (90) capable of receiving a control instruction signal corresponding to a user's operation, the controller (90) being configured to perform a swing control operation if receiving a swing control instruction signal for use to limit an operation for swinging the direction of the blown air in a cooling operation, the swing control operation being performed to swing the wind direction adjusting slat (51) so that the direction of the blown air shifts in a limited possible range (R2) where an angle of a lowermost wind direction relative to a horizontal plane is smaller than an angle of a lowermost wind direction relative to the horizontal plane in a normal possible range (R1), the normal possible range (R1) being previously determined to be a range where if the swing control instruction signal is not received in the cooling operation, the direction of the blown air can shift upward and downward.

In the twelfth aspect, if the swing control instruction signal is received, the swing control operation is performed. This can reduce the angle of the lowermost wind direction in the range where the direction of the blown air swings (the range where the direction of the blown air shifts upward and downward). This can make it less likely for the blown air to flow downward of the outlet opening (24a to 24d) than if the direction of the blown air is shifted in the normal possible range (R1) during the cooling operation. This allows the blown air to be distributed over the indoor space (500) to widely cool the indoor space (500). This can reduce the amount of variation in temperature among areas of the indoor space (500) and the load of the indoor space (500) in the cooling operation.

Advantages of the Invention

According to the first aspect of the disclosure, if the load of the indoor space (500) is higher than the predetermined value, the swing control operation is performed. This allows the blown air to be distributed over the indoor space (500) to widely cool the indoor space (500). This can reduce the amount of variation in temperature among areas of the indoor space (500) and the load of the indoor space (500) in the cooling operation.

According to the second aspect of the disclosure, defining the uppermost wind direction in the limited possible range (R2) as the direction of the blown air directed horizontally can increase the distance over which the blown air travels in the horizontal direction, thus distributing the blown air over a wide range of the indoor space (500). This can further reduce the amount of variation in temperature among areas of the indoor space (500) and the load of the indoor space (500).

According to the third aspect of the disclosure, the blown air is less likely to flow downward of the outlet opening (24a to 24d). Thus, the pattern in which the direction of the blown air shifts in the swing control operation can be set such that the blown air is distributed over a wide range of the indoor space (500). This can further reduce the amount of variation in temperature among areas of the indoor space (500) and the load of the indoor space (500).

According to the fourth aspect of the disclosure, the number of outlets for the blown air can be increased. As a result, the blown air can be distributed over a wide range of the indoor space (500). This can further reduce the amount of variation in temperature among areas of the indoor space (500) and the load of the indoor space (500).

According to the fifth aspect of the disclosure, the blown air is less likely to flow downward of the outlet openings (24a to 24d). Thus, the pattern in which the direction of the blown air shifts in the swing control operation can be set for each of the outlet openings (24a to 24d) such that the blown air is distributed over a wide range of the indoor space (500). This can further reduce the amount of variation in temperature among areas of the indoor space (500) and the load of the indoor space (500).

According to the sixth aspect of the disclosure, if the load of the indoor space (500) is higher than the predetermined value, the air current control operation is performed. This can increase the distance over which the blown air travels in the horizontal direction, thus distributing the blown air over a wide range of the indoor space (500). This can further reduce the amount of variation in temperature among areas of the indoor space (500) and the load of the indoor space (500).

According to the seventh aspect of the disclosure, the air current control operation is performed while switching is made between the first and second blowout modes. Thus, the blown air can be distributed over a wide range of the indoor space (500). This can further reduce the amount of variation in temperature among areas of the indoor space (500) and the load of the indoor space (500).

According to the eighth aspect of the disclosure, the air current control operation is performed while switching is made among the basic blowout mode, and the first and second blowout modes. Thus, the blown air can be distributed over a wide range of the indoor space (500). This can further reduce the amount of variation in temperature among areas of the indoor space (500) and the load of the indoor space (500).

According to the ninth aspect of the disclosure, the wind direction adjusting slats (51) serve also as the air current blocking mechanisms (50). This allows the number of parts of the indoor unit to be less than if the air current blocking mechanisms (50) are configured as different members from the wind direction adjusting slats (51).

According to the tenth aspect of the disclosure, if the load of the indoor space (500) is higher than the predetermined value, the opening control operation is performed. This can increase the distance over which the blown air travels in the horizontal direction, thus distributing the blown air over a wide range of the indoor space (500). This can further reduce the amount of variation in temperature among areas of the indoor space (500) and the load of the indoor space (500).

According to the eleventh aspect of the disclosure, if the load of the indoor space (500) is higher than the predetermined value, the fan control operation is performed. This can increase the distance over which the blown air travels in the horizontal direction, thus distributing the blown air over a wide range of the indoor space (500). This can further reduce the amount of variation in temperature among areas of the indoor space (500) and the load of the indoor space (500).

According to the twelfth aspect of the disclosure, if the swing control instruction signal is received, the swing control operation is performed. This allows the blown air to be distributed over the indoor space (500) to widely cool the indoor space (500). This can reduce the amount of variation in temperature among areas of the indoor space (500) and the load of the indoor space (500) in the cooling operation.

DETAILED DESCRIPTION

Figure 1:
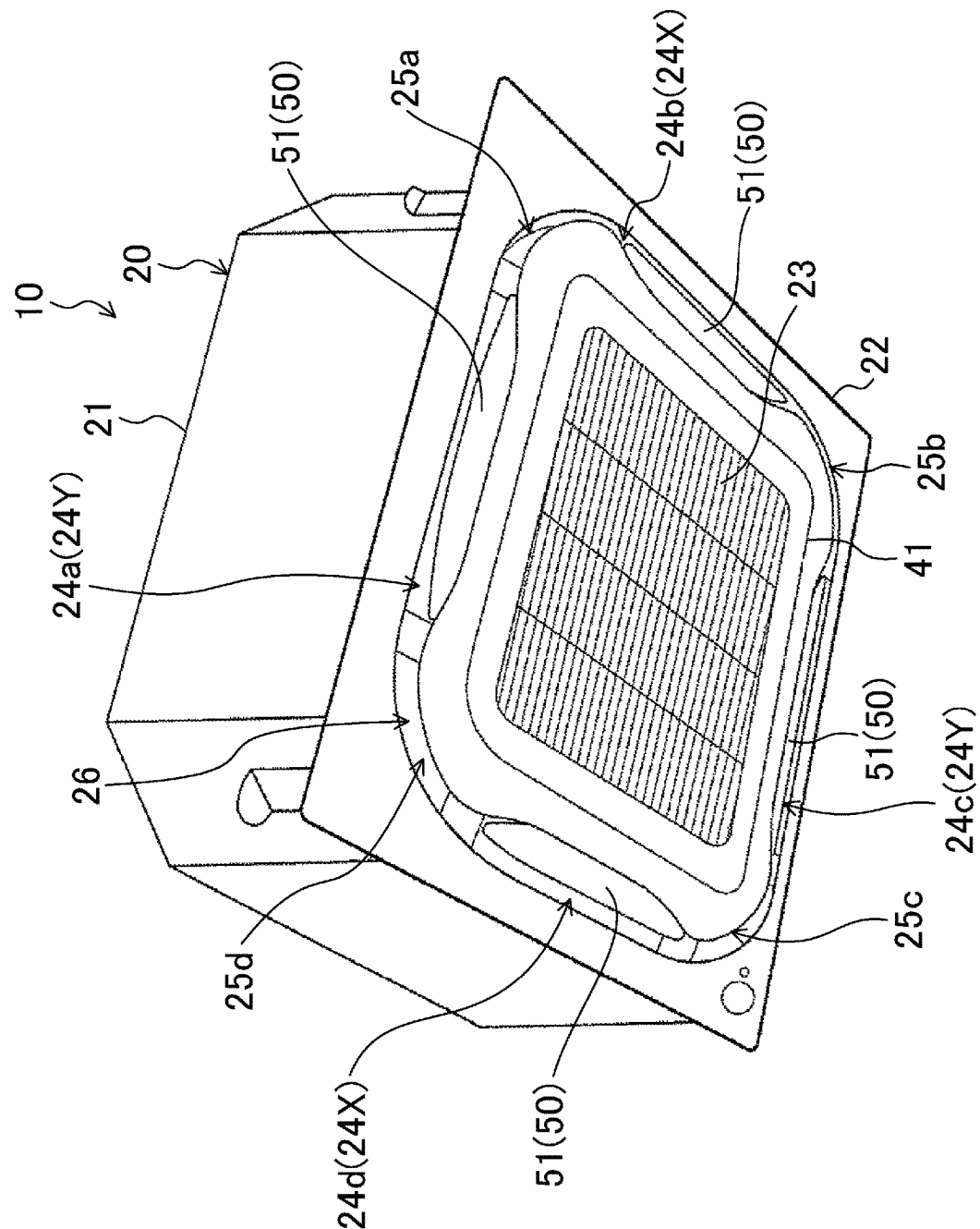
FIG. 1 is a perspective view showing the appearance of an indoor unit according to a first embodiment.

Embodiments will now be described in detail with reference to the drawings. Note that like reference characters denote the same or equivalent components in the drawings, and the description thereof will not be repeated.

First Embodiment

FIGS. 1 to 4 show an exemplary configuration of an indoor unit (10) of an air conditioner according to a first embodiment. The indoor unit (10) and an outdoor unit (not shown) constitute an air conditioner. In the air conditioner, the indoor unit (10) and the outdoor unit are connected together through an interconnecting pipe to form a refrigerant circuit through which a refrigerant circulates and which performs a refrigeration cycle.

The indoor unit (10) is configured to blow air (temperature-adjusted air) into an indoor space (500). In this example, the indoor unit (10) is configured as a so-called ceiling mounted indoor unit. The indoor unit (10) includes a casing (20) an indoor fan (31), an indoor heat exchanger (32), a drain pan (33), and a bell mouth (36), and an indoor controller (90).

Figure 2:
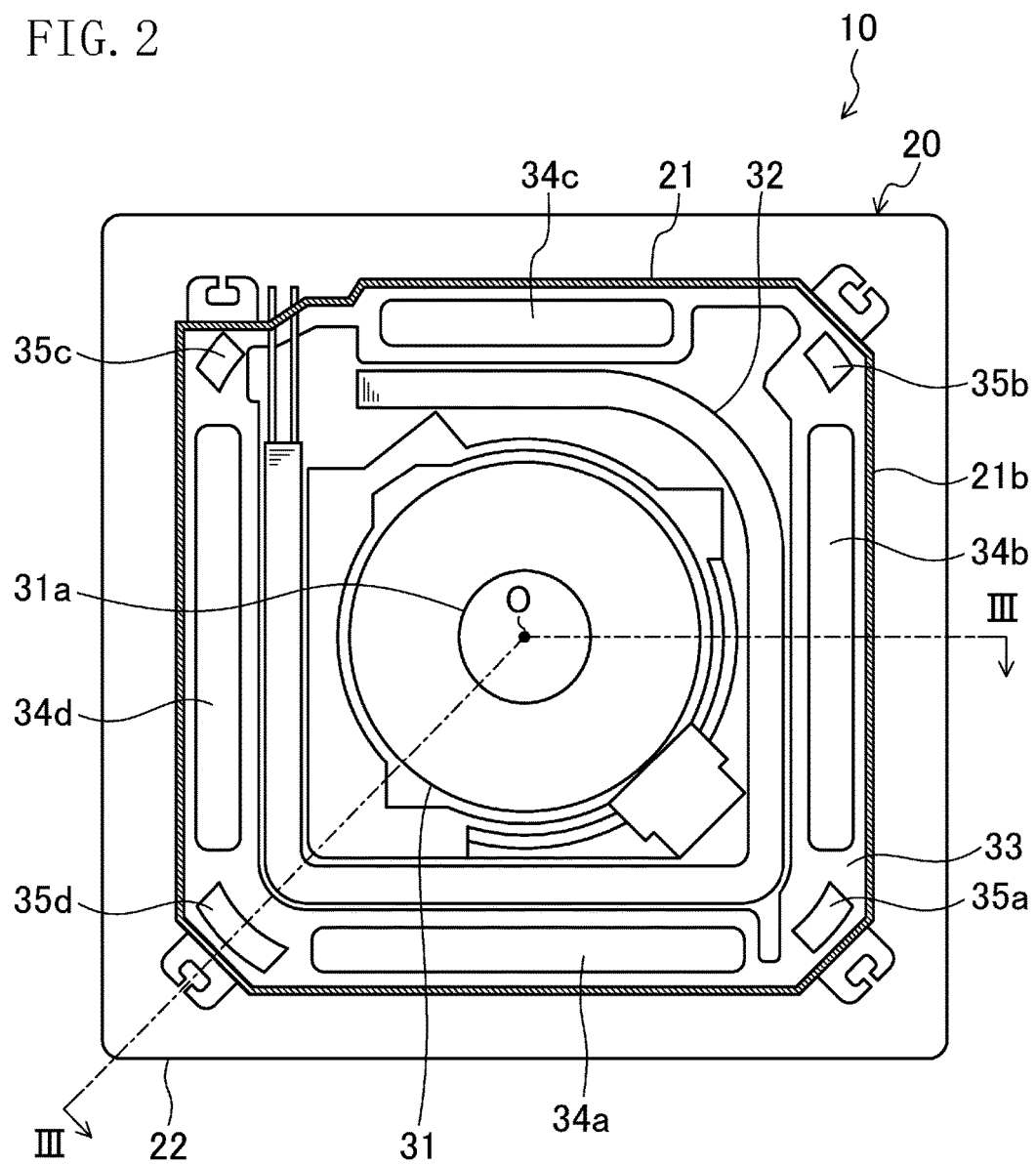
FIG. 2 is a schematic plan view for explaining an exemplary configuration of the indoor unit.
Figure 3:
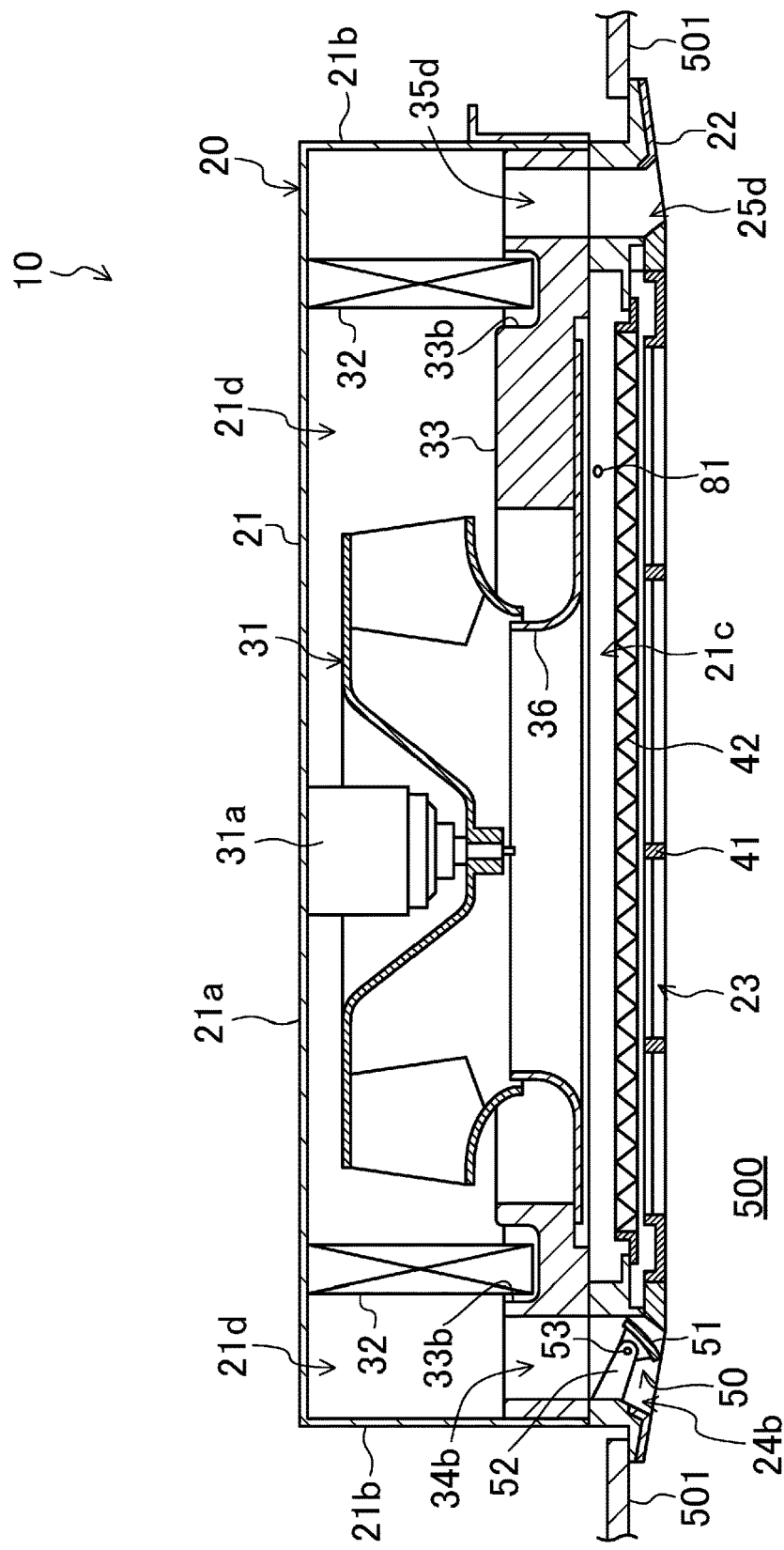
FIG. 3 is a schematic cross-sectional view for explaining an exemplary configuration of the indoor unit.
Figure 4:
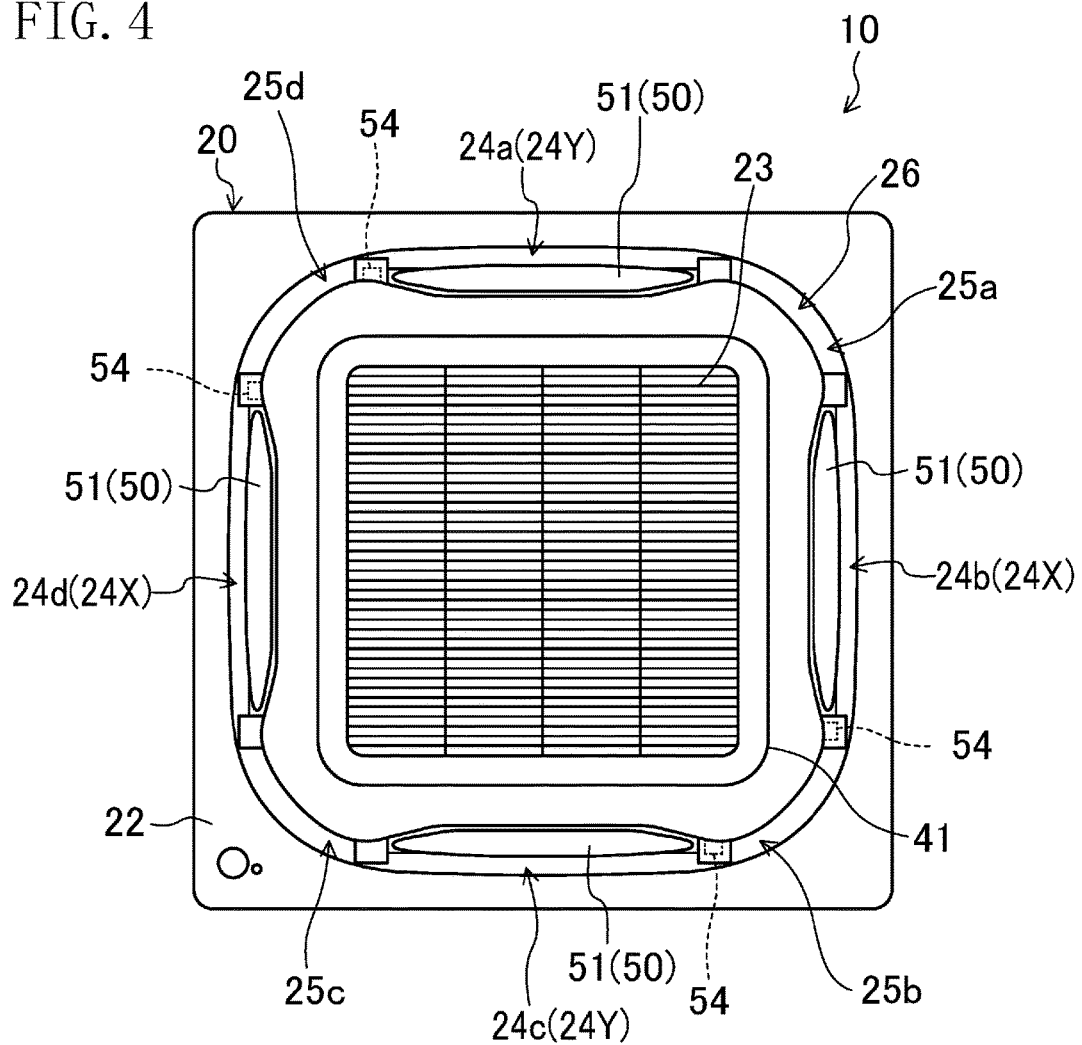
FIG. 4 is a schematic bottom view for explaining an exemplary configuration of the indoor unit.

FIG. 1 is a perspective view of the indoor unit (10) as viewed obliquely from below. FIG. 2 is a schematic plan view of the indoor unit (10), where a top panel of the casing (20) is omitted. FIG. 3 is a schematic cross-sectional view of the indoor unit (10) taken along line III-O-III shown in FIG. 2. FIG. 4 is a schematic bottom view of the indoor unit (10).

[Casing]

The casing (20) is mounted in a ceiling (501) of the indoor space (500). The casing (20) is comprised of a casing body (21) and a decorative panel (22). This casing (20) houses the indoor fan (31), the indoor heat exchanger (32), the drain pan (33), and the bell mouth (36).

The casing body (21) is inserted into an opening of the ceiling (501) of the indoor space (500). The casing body (21) has a generally rectangular parallelepiped box shape with an open lower face. The casing body (21) includes a generally flat top panel (21a), and side panels (21b) extending downward from the periphery of the top panel (21a).

[Indoor Fan]

As shown in FIG. 3, the indoor fan (31) is a centrifugal blower blowing air, sucked from below, radially outward. The indoor fan (31) is disposed in a central portion of the casing body (21). The indoor fan (31) is driven by an indoor fan motor (31a). The indoor fan motor (31a) is fixed on a central portion of the top panel (21a).

[Bell Mouth]

The bell mouth (36) is disposed below the indoor fan (31). The bell mouth (36) is a member for guiding, to the indoor fan (31), air that has flowed into the casing (20). The bell mouth (36) and the drain pan (33) section the internal space of the casing (20) into a primary space (21c) located on a suction side of the indoor fan (31) and a secondary space (21d) located on a blowout side of the indoor fan (31).

[Indoor Heat Exchanger]

The indoor heat exchanger (32) is a so-called cross-fin-type fin-and-tube heat exchanger. As shown in FIG. 2, the indoor heat exchanger (32) has a hollow square shape when viewed in plan, and surrounds the indoor fan (31). That is to say, the indoor heat exchanger (32) is disposed in the secondary space (21d). The indoor heat exchanger (32) exchanges heat between air passing through the indoor heat exchanger (32) from its inside toward its outside and a refrigerant in the refrigerant circuit.

[Drain Pan]

The drain pan (33) is a member made of so-called Styrofoam. As shown in FIG. 3, the drain pan (33) is disposed to block a lower end of the casing body (21). An upper surface of the drain pan (33) has a water receiving groove (33b) extending along a lower end of the indoor heat exchanger (32). A lower end portion of the indoor heat exchanger (32) is embedded in the water receiving groove (33b). The water receiving groove (33b) receives drain water produced in the indoor heat exchanger (32).

As shown in FIG. 2, the drain pan (33) has four main blowout passages (34a-34d) and four subsidiary blowout passages (35a-35d). The main blowout passages (34a-34d) and the subsidiary blowout passages (35a-35d) are passages through which air that has passed through the indoor heat exchanger (32) flows, and pass through the drain pan (33) in a vertical direction. The main blowout passages (34a-34d) are through holes each having an elongated rectangular cross section. The main blowout passages (34a-34d) are arranged along four sides of the casing body (21), respectively. The subsidiary blowout passages (35a-35d) are through holes each having a somewhat curved rectangular cross section. The subsidiary blowout passages (35a-35d) are arranged at four corners of the casing body (21), respectively. That is to say, the main blowout passages (34a-34d) and the subsidiary blowout passages (35a-35d) are alternately arranged along the periphery of the drain pan (33).

[Decorative Panel]

The decorative panel (22) is a resin member configured as a rectangular thick plate. A lower portion of the decorative panel (22) is formed in the shape of a square slightly larger than the top panel (21a) of the casing body (21). The decorative panel (22) covers a lower surface of the casing body (21). A lower surface of the decorative panel (22) forms a lower surface of the casing (20), and is exposed to the indoor space (500).

As shown in FIGS. 3 and 4, a central portion of the decorative panel (22) has a single square inlet (23). The inlet (23) passes through the decorative panel (22) in a vertical direction, and communicates with the primary space (21c) in the casing (20). Air sucked into the casing (20) flows through the inlet (23) into the primary space (21c). The inlet (23) is provided with a grid-like suction grille (41). A suction filter (42) is disposed above the suction grille (41).

The decorative panel (22) has a generally rectangular loop-shaped outlet (26) surrounding the inlet (23). As shown in FIG. 4, the outlet (26) is sectioned into four main outlet openings (24a-24d) and four subsidiary outlet openings (25a-25d).

The main outlet openings (24a-24d) are elongated openings each having a shape corresponding to the cross-sectional shape of an associated one of the main blowout passages (34a-34d). The main outlet openings (24a-24d) are arranged along four sides of the decorative panel (22), respectively. In the indoor unit (10) of the first embodiment, the second and fourth main outlet openings (24b) and (24d) extending along two of the four sides of the decorative panel (22) facing each other constitute first openings (24X). The other main outlet openings, i.e., the first and third main outlet openings (24a) and (24c) constitute second openings (24Y).

The main outlet openings (24a-24d) of the decorative panel (22) are in one-to-one correspondence with the main blowout passages (34a-34d) of the drain pan (33). The main outlet openings (24a-24d) each communicate with an associated one of the main blowout passages (34a-34d). Specifically, the first, second, third, and fourth main outlet openings (24a), (24b), (24c), and (24d) communicate with the first main blowout passages (34a), (34b), (34c), and (34d), respectively.

The subsidiary outlet openings (25a-25d) are in the form of an arc of a quarter circle. The subsidiary outlet openings (25a-25d) are disposed at four corners of the decorative panel (22), respectively. The subsidiary outlet openings (25a-25d) of the decorative panel (22) are in one-to-one correspondence with the subsidiary blowout passages (35a-35d) of the drain pan (33). The subsidiary outlet openings (25a-25d) each communicate with an associated one of the subsidiary blowout passages (35a-35d). Specifically, the first, second, third, and fourth subsidiary outlet openings (25a), (25b), (25c), and (25d) communicate with the first, second, third, and fourth subsidiary blowout passages (35a), (35b), (35c), and (35d), respectively.

[Wind Direction Adjusting Slat]

As shown in FIG. 4, each of the main outlet openings (24a-24d) is provided with a wind direction adjusting slat (51). The wind direction adjusting slats (51) are each a member for shifting the direction of air blown through an associated one of the main outlet openings (24a-24d) (hereinafter referred to as "blown air") upward and downward. Specifically, each wind direction adjusting slat (51) shifts the direction of the blown air so that the angle between the direction of the blown air and a horizontal plane (the angle at which the direction of the blown air is inclined relative to the horizontal plane) varies. Operation of the wind direction adjusting slats (51) and the direction of the blown air will be described in detail below.

In this example, the wind direction adjusting slats (51) are each formed in the shape of an elongated plate extending from one longitudinal end of an associated one of the main outlet openings (24a-24d) of the decorative panel (22) to the other end thereof. As shown in FIG. 3, each wind direction adjusting slat (51) is supported by a support member (52) so as to be capable of swinging (turning) around a central axis (53) extending in the longitudinal direction of the wind direction adjusting slat (51). The wind direction adjusting slat (51) is curved to have a transverse cross section (orthogonal to the longitudinal direction) protruding away from the central axis (53) around which the wind direction adjusting slat swings.

As shown in FIG. 4, each wind direction adjusting slat (51) is connected to a drive motor (54). The wind direction adjusting slat (51) is driven by the drive motor (54), and swings (turns) around the central axis (53) within a predetermined angle range. Note that the central axis (53) extends substantially horizontally. Thus, swinging (turning) the wind direction adjusting slat (51) around the central axis (53) can shift the direction of the blown air upward and downward around a horizontal axis.

[Various Sensors]

The indoor unit (10) includes various sensors such as an inlet temperature sensor (81). The inlet temperature sensor (81) is provided at the inlet (23), and is configured to sense the temperature of air sucked into the indoor fan (31) through the inlet (23) (hereinafter referred to as the "inlet temperature").

[Indoor Controller]

Figure 5:
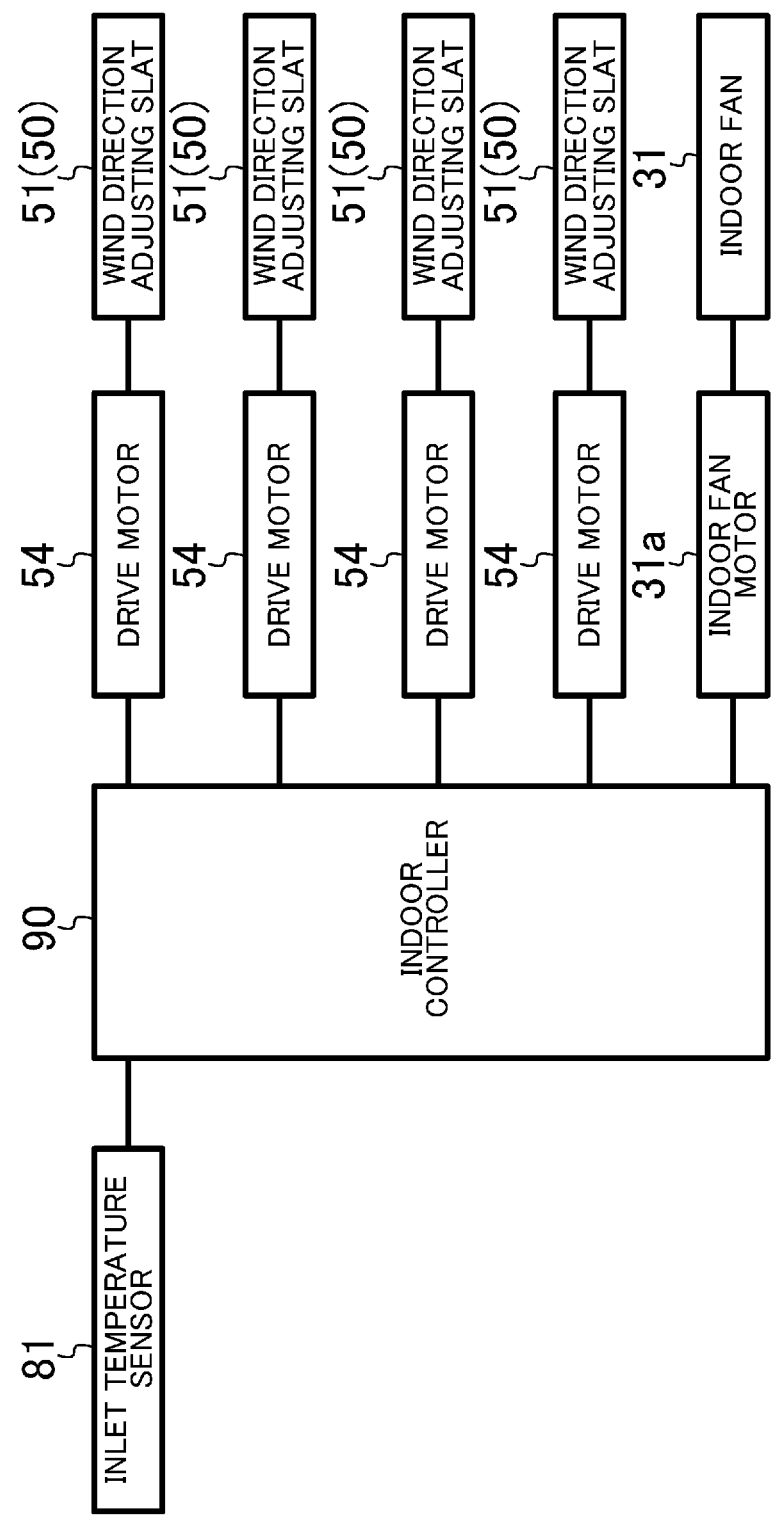
FIG. 5 is a block diagram for explaining an exemplary configuration of an indoor controller.

The indoor controller (90) is configured as, for example, a CPU or a memory. As shown in FIG. 5, the indoor controller (90) is connected to the various sensors, such as the inlet temperature sensor (81), and target components of the indoor unit (10) to be controlled (specifically, the drive motors (54) and the indoor fan motor (31a)), and is configured to control components of the indoor unit (10) based on values sensed by the various sensors to control operation of the indoor unit (10). Specifically, the indoor controller (90) controls the indoor fan motor (31a) to control operation of the indoor fan (31), and controls the drive motors (54) to control operations of the associated wind direction adjusting slats (51). In this example, the indoor controller (90) is configured to individually control the four wind direction adjusting slats (51). Operation of the indoor controller (90) will be described in detail below.

[Current of Air in Indoor Unit]

Next, a current of air in the indoor unit (10) will be described with reference to FIG. 3. During operation of the indoor unit (10), the indoor fan (31) rotates. The rotating indoor fan (31) allows air in the indoor space (500) to flow through the inlet (23) into the primary space (21c) in the casing (20). The air that has flowed into the primary space (21c) is sucked into the indoor fan (31), and is blown into the secondary space (21d). The air that has flowed into the secondary space (21d) is cooled (or heated) while passing through the indoor heat exchanger (32). Then, the cooled (or heated) air flows separately into the four main blowout passages (34a-34d) and the four subsidiary blowout passages (35a-35d). The air that has flowed into the main blowout passages (34a-34d) is blown into the indoor space (500) through the main outlet openings (24a-24d). The air that has flowed into the subsidiary blowout passages (35a-35d) is blown into the indoor space (500) through the subsidiary outlet openings (25a-25d).

[Operation of Wind Direction Adjusting Slat and Direction of Blown Air]

Next, operations of the wind direction adjusting slats (51) and the direction of blown air will be described with reference to FIGS. 6 to 9. Changing the locations (positions) of the wind direction adjusting slats (51) triggers a shift in the direction of blown air.

Figure 6:
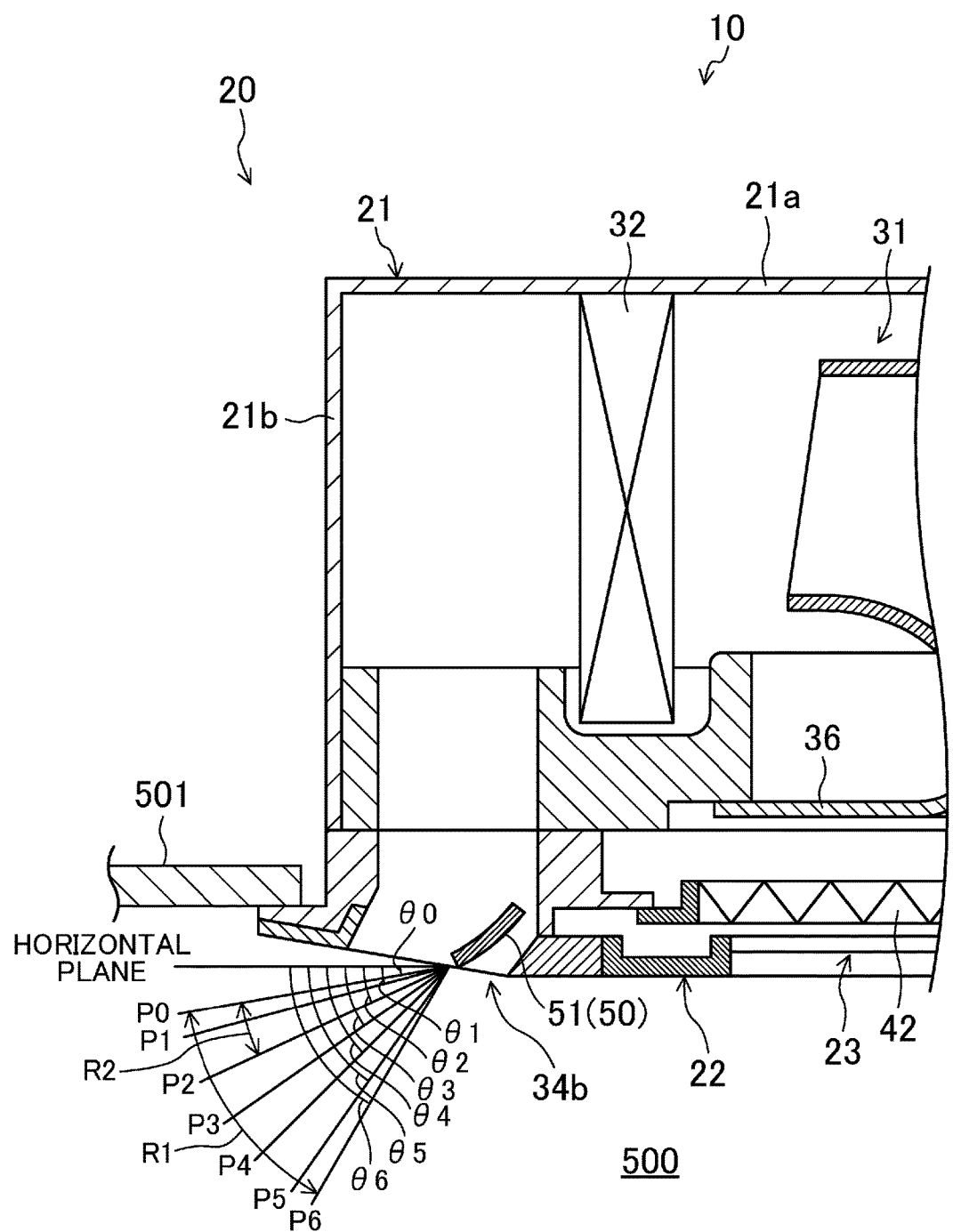
FIG. 6 is a schematic cross-sectional view for explaining the direction of blown air.

As shown in FIG. 6, the direction of blown air can be shifted within a predetermined possible range (specifically, the range between an uppermost wind direction (P0) and a lowermost wind direction (P6)). Specifically, the wind direction adjusting slats (51) are configured to be capable of swinging within a predetermined swingable range (specifically, the range between the uppermost position and the lowermost position). When each wind direction adjusting slat (51) is in the uppermost position, the direction of the blown air corresponds to the uppermost wind direction (P0). When the wind direction adjusting slat (51) is in the lowermost position, the direction of the blown air corresponds to the lowermost wind direction (P6).

Figure 7:
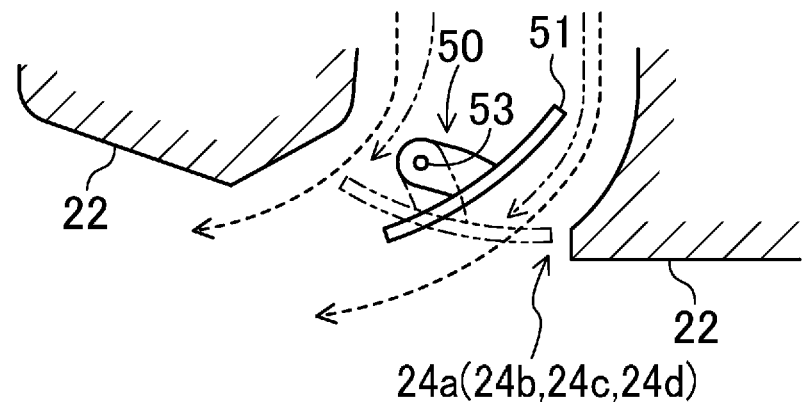
FIG. 7 is a schematic cross-sectional view for explaining the position of a wind direction adjusting slat and a current of blown air in a state where air is blown horizontally.

In this example, the uppermost wind direction (P0) in the possible range is set to be the direction of blown air in a state where the blown air is directed horizontally (FIG. 7). Note that although, in this example, strictly speaking, the direction of blown air is inclined slightly downward relative to a horizontal direction, it can be said that the blown air is directed horizontally. Specifically, the state where the blown air is directed horizontally includes not only a state where the direction of blown air is completely horizontal, but also a state where the direction of blown air is substantially horizontal (e.g., a state where the angle of inclination of the direction of blown air relative to a horizontal plane is within the range from about +20° to about −20°. In this embodiment, if the direction of the blown air is inclined downward relative to the horizontal plane, the angle of inclination of the direction of blown air relative to the horizontal plane is positive, whereas if the direction of the blown air is inclined upward relative to the horizontal plane, the angle of inclination of the direction of blown air relative to the horizontal plane is negative.

As shown in FIG. 7, if each of the wind direction adjusting slats (51) is in a position in which air is blown horizontally (i.e., the swing position corresponding to the direction of blown air in a state where the blown air is directed horizontally), the downward direction of air flowing through an associated one of the main blowout passages (34a-34d) is changed to a lateral direction. Thus, air blown through an associated one of the main outlet openings (24a-24d) is directed horizontally.

Figure 8:
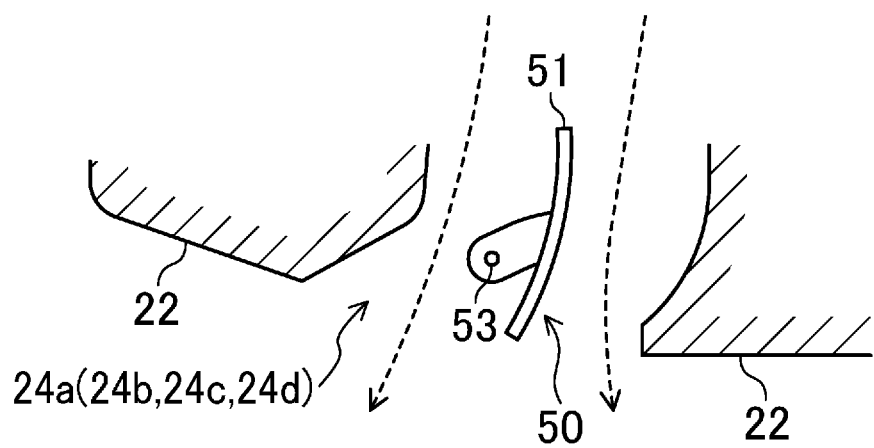
FIG. 8 is a schematic cross-sectional view for explaining the position of the wind direction adjusting slat and a current of blown air in a state where air is blown downward.

In this example, the lowermost wind direction (P6) in the possible range is set to be the direction of blown air in a state where the blown air is directed downward (FIG. 8). Note that although, in this example, strictly speaking, the direction of blown air is an obliquely downward direction slightly inclined in a direction away from the inlet (23) (specifically, a direction inclined about 60° downward relative to the horizontal plane) rather than a directly downward direction, it can be said that the blown air is directed downward. Specifically, the state where the blown air is directed downward includes not only a state where the direction of blown air is a downward direction orthogonal to the horizontal plane (i.e., a vertical direction), but also a state where the direction of blown air is an obliquely downward direction (e.g., a state where the angle of inclination of the direction of blown air relative to the horizontal plane is within the range from about 60° to about 90°).

As shown in FIG. 8, if each of the wind direction adjusting slats (51) is in a position in which air is blown downward (i.e., the swing position corresponding to the direction of blown air in a state where the blown air is directed downward), the downward direction of air flowing through an associated one of the main blowout passages (34a-34d) is generally maintained as it is. Thus, air blown through an associated one of the main outlet openings (24a-24d) is directed downward.

In this example, a first wind direction (P1), a second wind direction (P2), a third wind direction (P3), a fourth wind direction (P4), and a fifth wind direction (P5) are set in this order from the uppermost wind direction (P0) toward the lowermost wind direction (P6) in the possible range in which the blown air is directed. In other words, the direction of the blown air is switchable among many levels (in this example, seven levels) in the possible range. A first wind direction angle (θ1) is larger than an uppermost wind direction angle (θ0), wind direction angles are larger in the order of the first, second, third, fourth, and fifth wind direction angles (θ1), (θ2), (θ3), (θ4), and (θ5), and a lowermost wind direction angle (θ6) is larger than the fifth wind direction angle (θ5), where the angle of the uppermost wind direction (P0) (the angle of inclination of the wind direction relative to the horizontal plane) is the uppermost wind direction angle (θ0), the angles of the first, second, third, fourth, and fifth wind directions (P1, P2, P3, P4, P5) are the first, second, third, fourth, and fifth wind direction angles (θ1, θ2, θ3, θ4, θ5), respectively, and the angle of the lowermost wind direction (P6) is the lowermost wind direction angle (θ6).

Figure 9:
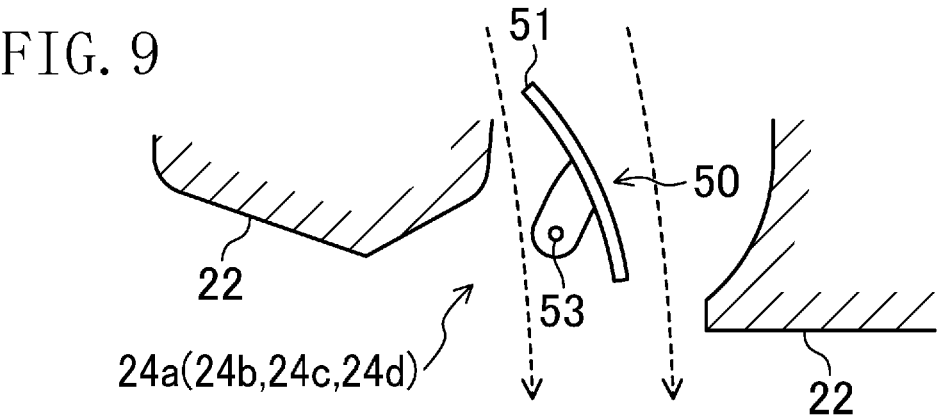
FIG. 9 is a schematic cross-sectional view for explaining the position of the wind direction adjusting slat and a current of blown air in a state where an air current is blocked.
Figure 10:
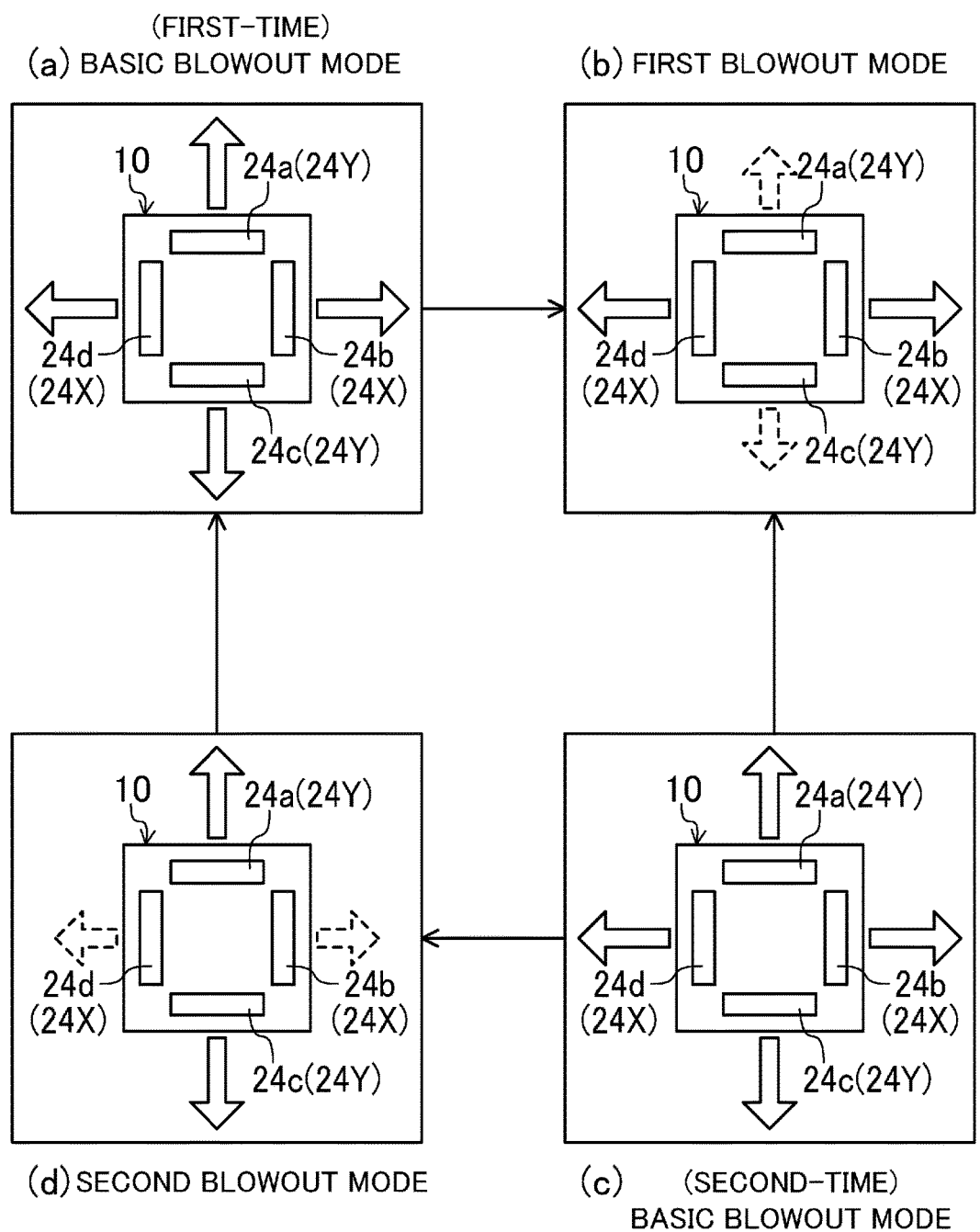
FIG. 10 is a schematic view for explaining an air current control operation.

In addition, in this example, each wind direction adjusting slat (51) further turns from its position in which air is blown downward (FIG. 8) to be movable also to an air current blocking position (FIG. 9). If the wind direction adjusting slat (51) is in the air current blocking position, a current of air passing through the associated main outlet opening (24a-24d) is hindered (an air current blocking state). That is to say, in this example, the wind direction adjusting slat (51) can shift to the air current blocking position to block a current of air passing through the associated main outlet opening (24a-24d), and acts also as an air current blocking mechanism (50) for blocking a current of air through the associated main outlet opening (24a-24d).

If, as shown in FIG. 9, the wind direction adjusting slat (51) is in the air current blocking position, a major portion of the associated main outlet opening (24a-24d) is blocked by the wind direction adjusting slat (51), and the direction of the air that has flowed downward through the associated main blowout passage (34a-34d) is changed to a direction toward the inlet (23). In this case, the pressure loss of air that is passing through the main outlet openings (24a-24d) increases. This reduces the flow rate of the air passing through the main outlet openings (24a-24d). Conditioned air (i.e., air that has flowed downward through the main blow-out passages (34a-34d)) is blown toward the inlet (23) through the main outlet openings (24a-24d). This allows air blown through the main outlet openings (24a-24d) to be immediately sucked into the inlet (23). That is to say, conditioned air is not substantially supplied into the indoor space (500) through the main outlet openings (24a-24d) at each of which the associated wind direction adjusting slat (51) is in the air current blocking position.

[Operation of Indoor Controller]

The indoor controller (90) controls components of the indoor unit (10) so that the indoor unit (10) selectively performs a heating operation or a cooling operation.

<Heating Operation>

In the heating operation, the indoor controller (90) places the indoor fan (31) in a driven state. Note that the indoor heat exchanger (32) functions as a condenser. Thus, air in the indoor space (500) is sucked into the indoor fan (31) through the inlet (23), and is then blown from the indoor fan (31). The blown air is heated while passing through the indoor heat exchanger (32). Part of the air heated in the indoor heat exchanger (32) is blown into the indoor space (500) through the subsidiary outlet openings (25a-25d).

In the heating operation, the indoor controller (90) controls the wind direction adjusting slats (51) provided at the four main outlet openings (24a-24d) so that the direction of the blown air falls within the predetermined possible range (e.g., the range between the uppermost wind direction (P1) and the lowermost wind direction (P6)) at each of the main outlet openings (24a-24d). Thus, the air heated in the indoor heat exchanger (32) (i.e., warm air) is blown through the main outlet openings (24a-24d) at a predetermined wind direction angle.

<Cooling Operation>

In the cooling operation, the indoor controller (90) places the indoor fan (31) in a driven state. Note that the indoor heat exchanger (32) functions as an evaporator. Thus, air in the indoor space (500) is sucked into the indoor fan (31) through the inlet (23), and is then blown from the indoor fan (31). The blown air is cooled while passing through the indoor heat exchanger (32). Part of the air cooled in the indoor heat exchanger (32) is blown into the indoor space (500) through the subsidiary outlet openings (25a-25d).

In the cooling operation, the indoor controller (90) selectively performs a normal cooling control or a high-load cooling control in accordance with the load of the indoor space (500). Specifically, the indoor controller (90) senses the load of the indoor space (500). If the sensed load of the indoor space (500) is lower than a predetermined value, the indoor controller (90) performs the normal cooling control. If the sensed load of the indoor space (500) is higher than the predetermined value, the indoor controller (90) performs the high-load cooling control. In this example, the indoor controller (90) treats the difference between the inlet temperature sensed by the inlet temperature sensor (81) and a predetermined target cooling temperature (the difference obtained by subtracting the target cooling temperature from the inlet temperature) as the load of the indoor space (500).

«Normal Cooling Control»

Under the normal cooling control, the indoor controller (90) controls the wind direction adjusting slats (51) provided at the four main outlet openings (24a-24d) so that the angle of the direction of the blown air falls within a predetermined normal possible range (R1) at each of the main outlet openings (24a-24d). Thus, the air cooled in the indoor heat exchanger (32) (i.e., cold air) is blown through the main outlet openings (24a-24d) at a predetermined wind direction angle.

Note that the normal possible range (R1) previously determined is a range where if the load of the indoor space (500) is lower than the predetermined value in the cooling operation, the direction of the blown air can shift upward and downward. In this example, as shown in FIG. 6, the uppermost wind direction in the normal possible range (R1) is set to be the uppermost wind direction (P0), and the lowermost wind direction in the normal possible range (R1) is set to be the lowermost wind direction (P6).

«High-Load Cooling Control»

Under the high-load cooling control, the indoor controller (90) performs the air current control operation. In the air current control operation, the indoor controller (90) controls the four wind direction adjusting slats (51) each provided at an associated one of the four main outlet openings (24a-24d) so that a current of air through one or some of the four main outlet openings (24a-24d) is blocked by the associated wind direction adjusting slat or slats (51) to increase the velocity of the air blown through the other main outlet openings or opening (24a-24d).

In this example, the indoor controller (90) performs the air current control operation while switching among a basic blowout mode, a first blowout mode, and a second blowout mode. Specifically, as shown in FIG. 9, operation is performed in the first-time basic blowout mode, the first blowout mode, the second-time basic blowout mode, and the second blowout mode in this order during one cycle for the air current control operation. The indoor controller (90) controls the indoor fan (31) in the air current control operation so that the rotational speed of the indoor fan (31) is kept at a substantially constant speed.

Under the high-load cooling control, the indoor controller (90) performs a swing control operation together with the air current control operation in the basic blowout mode, performs a first wind direction fixing operation together with the air current control operation in the first blowout mode, and performs a second wind direction fixing operation together with the air current control operation in the second blowout mode.

—Basic Blowout Mode and Swing Control Operation—

In the basic blowout mode, the indoor controller (90) controls the four air current blocking mechanisms (in this example, the four wind direction adjusting slats (51)) each provided at an associated one of the four main outlet openings (24a-24d) so that air (temperature-adjusted air) is blown through all of the four main outlet openings (24a-24d) toward the indoor space (500).

In this example, an operation in the basic blowout mode and the swing control operation are performed. In the swing control operation, the indoor controller (90) swings (reciprocates) the wind direction adjusting slat (51) provided at each of the main outlet openings (24a-24d) so that the direction of air blown through the main outlet opening (24a-24d) shifts (reciprocates) in a predetermined limited possible range (R2). In other words, the indoor controller (90) swings the four wind direction adjusting slats (51) each provided at an associated one of the main outlet openings (24a-24d) so that the direction of blown air through each of the four main outlet openings (24a-24d) shifts in the limited possible range (R2).

As shown in FIG. 6, the angle of the lowermost wind direction in the limited possible range (R2) (relative to the horizontal plane) is smaller than the angle of the lowermost wind direction in the normal possible range (R1) (relative to the horizontal plane). In this example, the lowermost wind direction in the limited possible range (R2) is set to be the second wind direction (P2). Specifically, the angle of the lowermost wind direction in the limited possible range (R2) is set to be a wind direction angle (in this example, the second wind direction angle (θ2)) smaller than the angle of the lowermost wind direction in the normal possible range (R1) (in this example, the lowermost wind direction angle (θ6)). The uppermost wind direction in the limited possible range (R2) is set to be the uppermost wind direction (P0) (i.e., the direction of air blown horizontally). In other words, in this example, the limited possible range (R2) is narrower than the normal possible range (R1).

In the swing control operation, the indoor controller (90) swings the wind direction adjusting slats (51) so that the direction of the blown air in the limited possible range (R2) shifts in a predetermined pattern. Specifically, in the swing control operation, the indoor controller (90) swings the four wind direction adjusting slats (51) each provided at an associated one of the four main outlet openings (24a-24d) so that the directions of air blown through the four main outlet openings (24a-24d) shift in respective patterns, which are each previously determined for an associated one of the main outlet openings (24a-24d).

The patterns in which the directions of the blown air shift are defined according to, for example, the speed at which the direction of the blown air shifts upward and downward, the timing at which the direction of the blown air starts shifting, the period of time during which the direction of the blown air corresponds to the uppermost wind direction in the limited possible range (R2) (in this example, the uppermost wind direction (P0)), the period of time during which the direction of the blown air corresponds to the lowermost wind direction in the limited possible range (R2) (in this example, the second wind direction (P2)), or the period of time during which the direction of the blown air corresponds to the first wind direction (P1) (alternatively, second, third, fourth, or fifth wind direction (P2. P3. P4. P5)) in the limited possible range (R2). The patterns in which the directions of the blown air through the four main outlet openings (24a-24d) shift may be identical or different.

As can be seen, performing the swing control operation together with the operation in the basic blowout mode allows air (i.e., air cooled in the indoor heat exchanger (32)) to be blown through the four main outlet openings (24a-24d) toward the indoor space (500), and allows the direction of the blown air to shift (reciprocate) in the limited possible range (R2).

—First Blowout Mode and First Wind Direction Fixing Operation—

In the first blowout mode, the indoor controller (90) controls the four air current blocking mechanisms (in this example, the four wind direction adjusting slats (51)) each provided at an associated one of the four main outlet openings (24a-24d) so that currents of air through two (24b, 24d) of the four main outlet openings (24a-24d) constituting the first openings (24X) are blocked by the associated air current blocking mechanisms (in this example, the associated wind direction adjusting slats (51)) to increase the velocity of the air blown through the other main outlet openings (24a, 24c) constituting the second openings (24Y).

In this example, in the first blowout mode, the indoor controller (90) places the wind direction adjusting slats (51) for the two main outlet openings (24b, 24d) constituting, the first openings (24X) in the air current blocking position. This substantially prevents air from being blown through the two main outlet openings (24b, 24d) constituting the first openings (24X) toward the indoor space (500).

An operation in the first blowout mode and the first wind direction fixing operation are performed. In the first wind direction fixing operation, the indoor controller (90) controls the two wind direction adjusting slats (51) respectively provided at two (24a, 24c) of the four main outlet openings (24a-24d) constituting the second openings (24Y) so that air is blown horizontally through the two main outlet openings (24a, 24c) constituting the second openings (24Y). In this example, the indoor controller (90) places the wind direction adjusting slats (51) for the two main outlet openings (24a, 24c) in the position in which air is blown horizontally (i.e., the position corresponding to the uppermost wind direction (P0)), so that the direction of the blown air through the two main outlet openings (24a, 24c) constituting the second openings (24Y) corresponds to the uppermost wind direction (P0).

As can be seen, performing the first wind direction fixing operation together with the operation in the first blowout mode allows air (i.e., air cooled in the indoor heat exchanger (32)) to be blown through the first and third main outlet openings (24a) and (24c) constituting the second openings (24Y) toward the indoor space (500), and allows the air to be blown substantially horizontally at a higher flow velocity than in the basic blowout mode.

—Second Blowout Mode and Second Wind Direction Fixing Operation—

In the second blowout mode, the indoor controller (90) controls the four air current blocking mechanisms (in this example, the four wind direction adjusting slats (51)) each provided at an associated one of the four main outlet openings (24a-24d) so that currents of air through two (24a, 24c) of the four main outlet openings (24a-24d) constituting the second openings (24Y) are blocked by the associated air current blocking mechanisms (in this example, the associated wind direction adjusting slats (51)) to increase the velocity of the air blown through the other main outlet openings (24b, 24d) constituting the first openings (24X).

In this example, in the second blowout mode, the indoor controller (90) places the wind direction adjusting slats (51) for the two main outlet openings (24a, 24c) constituting the second openings (24Y) in the air current blocking position. This substantially prevents air from being blown through the two main outlet openings (24a, 24c) constituting the second openings (24Y) toward the indoor space (500).

An operation in the second blowout mode and the second wind direction fixing operation are performed. In the second wind direction fixing operation, the indoor controller (90) controls the two wind direction adjusting slats (51) respectively provided at the two main outlet openings (24b, 24d) forming the first openings (24X) so that air is blown horizontally through two (24b, 24d) of the four main outlet openings (24a-24d) constituting the first openings (24X). In this example, the indoor controller (90) places the wind direction adjusting slats (51) for the two main outlet openings (24b, 24d) at the position in which air is blown horizontally (i.e., the position corresponding to the uppermost wind direction (P0)), so that the direction of the blown air through the two main outlet openings (24b, 24d) forming the second openings (24X) corresponds to the uppermost wind direction (P0).

As can be seen, performing the second wind direction fixing operation together with the operation in the second blowout mode allows air (i.e., air cooled in the indoor heat exchanger (32)) to be blown through the first and third main outlet openings (24a) and (24c) constituting the first openings (24X) toward the indoor space (500), and allows blown the air to be blown substantially horizontally at a higher flow velocity than in the basic blowout mode.

Advantages of First Embodiment

As can be seen from the foregoing description, under the high-load cooling control (i.e., if the load of the indoor space (500) is higher than the predetermined value in the cooling operation), the swing control operation is performed. This can reduce the angle of the lowermost wind direction (relative to the horizontal plane) in the range where the direction of blown air swings (the range where the direction of the blown air shifts upward and downward). Specifically, the angle of the lowermost wind direction in the range where the direction of blown air swings can be set to be the lowermost wind direction angle in a limited possible range (R2) (in this example, the wind direction angle (θ2)). This angle of the lowermost wind direction in the limited possible range (R2) is smaller than the angle of the lowermost wind direction in the normal possible range (R1) (in this example, the lowermost wind direction angle (θ6)). This can make it less likely for blown air to flow downward of the main outlet openings (24a-24d) than if the direction of blown air is shifted in the normal possible range (R1) during the cooling operation. This allows blown air to be distributed over the indoor space (500) to widely cool the indoor space (500). This can reduce the amount of variation in temperature among areas of the indoor space (500) and the load of the indoor space (500) in the cooling operation.

Determining the uppermost wind direction in the limited possible range (R2) to be the direction of air blown horizontally (in this example, the uppermost wind direction (P0)) can facilitate blowing air through the main outlet openings (24a-24d) toward a distant location in a horizontal direction. This can increase the distance over which the blown air travels in the horizontal direction, thus distributing the blown air over a wide range of the indoor space (500). This can further reduce the amount of variation in temperature among areas of the indoor space (500) and the load of the indoor space (500).

The indoor controller (90) is configured to swing the wind direction adjusting slats (51) so that in the swing control operation, the direction of blown air shifts in a predetermined pattern. Thus, the pattern in which the direction of the blown air shifts in the swing control operation can be optionally set. Thus, the pattern in which the direction of the blown air shifts can be set such that during the period of a cycle in which the blown air swings (i.e., the time that it takes for the direction of the blown air to reciprocate the limited possible range (R2) once), the period during which the direction of the blown air is located in a relatively upper region of the limited possible range (R2) (hereinafter referred to as the "upper blowout period") is longer than the period during which the direction of the blown air is located in a relatively lower region of the limited possible range (R2) (hereinafter referred to as the "lower blowout period"). Such settings can make it less likely for blown air to flow downward of the main outlet openings (24a-24d). This allows the blown air to be distributed over a wide range of the indoor space (500). This can further reduce the amount of variation in temperature among areas of the indoor space (500) and the load of the indoor space (500).

The casing (20) having the multiple main outlet openings (24a-24d) can increase the number of outlets for blown air. Thus, the blown air can be distributed over a wide range of the indoor space (500). This can further reduce the amount of variation in temperature among areas of the indoor space (500) and the load of the indoor space (500).

The indoor controller (90) is configured to swing the wind direction adjusting slats (51) in a swing control operation so that the direction of air blown through each of the main outlet openings (24a-24d) shifts in a predetermined pattern. Thus, the pattern in which the direction of air blown through each of the main outlet openings (24a-24d) shifts in the swing control operation can be optionally set. Thus, the pattern in which the direction of air blown through each of the main outlet openings (24a-24d) shifts can be set such that during the period of the cycle in which blown air swings, the upper blowout period is longer than the lower blowout period. Such settings can make it less likely for blown air to flow downward of the main outlet openings (24a-24d). This allows the blown air to be distributed over a wide range of the indoor space (500). This can further reduce the amount of variation in temperature among areas of the indoor space (500) and the load of the indoor space (500).

Performing the air current control operation under the high-load cooling control (i.e., if the load of the indoor space (500) is higher than the predetermined value in the cooling operation) can increase the velocity of air blown through the main outlet opening(s) (24a-24d) at which the air current blocking mechanism(s) (50) does not block a current of air. This can facilitate blowing air through the main outlet opening(s) (24a-24d) at which the air current blocking mechanism(s) (50) do not block the current of air toward a distant location in a horizontal direction. This can increase the distance over which the blown air travels in the horizontal direction, thus distributing the blown air over a wide range of the indoor space (500). This can further reduce the amount of variation in temperature among areas of the indoor space (500) and the load of the indoor space (500).

The air current control operation is performed while switching is made between the first and second blowout modes, thereby distributing blown air over a wider range of the indoor space (500) than if outlets for the blown air are fixed (i.e., if an operation is performed in only either the first or second blowout mode). This can further reduce the amount of variation in temperature among areas of the indoor space (500) and the load of the indoor space (500).

The air current control operation is performed while switching is made among the basic blowout mode, the first blowout mode, and the second blowout mode. This allows blown air to be supplied to a region relatively close to the indoor unit (10) in the basic blowout mode and to be supplied to a region relatively far from the indoor unit (10) in the first and second blowout modes. Thus, the blown air can be distributed over a wide range of the indoor space (500). This can further reduce the amount of variation in temperature among areas of the indoor space (500) and the load of the indoor space (500).

The wind direction adjusting slats (51) serving also as air current blocking mechanisms (50) allows the number of parts of the indoor unit (10) to be less than if the air current blocking mechanisms (50) are configured as different members from the wind direction adjusting slats (51).

[Variation of Air Current Blocking Mechanism]

Note that in the foregoing description, for example, the wind direction adjusting slats (51) serve also as the air current blocking mechanisms (50), but the air current blocking mechanisms (50) may be configured as different members from the wind direction adjusting slats (51). For example, the air current blocking mechanisms (50) may be configured as openable shutters (shutters capable of opening and closing the main outlet openings (24a-24d)) each provided at an associated one of the main outlet openings (24a-24d).

[First Variation of Air Current Control Operation]

Figure 11:
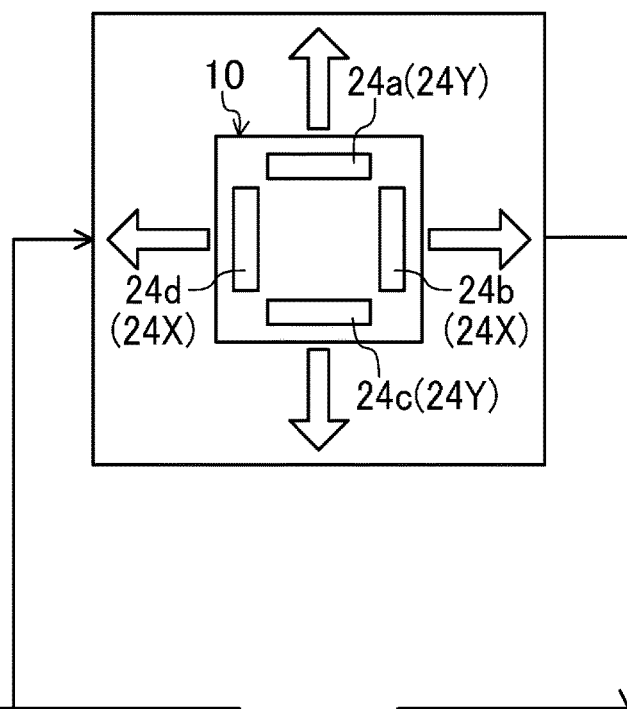
FIG. 11 is a schematic view for explaining a variation of the air current control operation.
Figure 11:
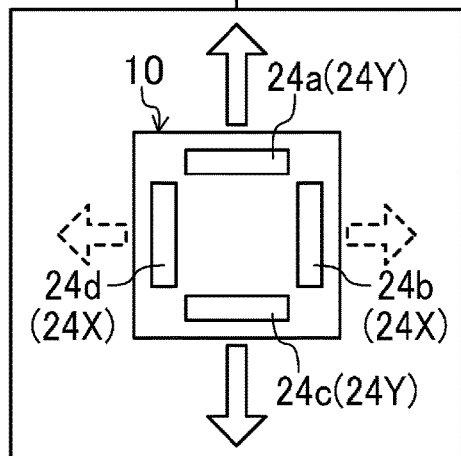
Figure 11:
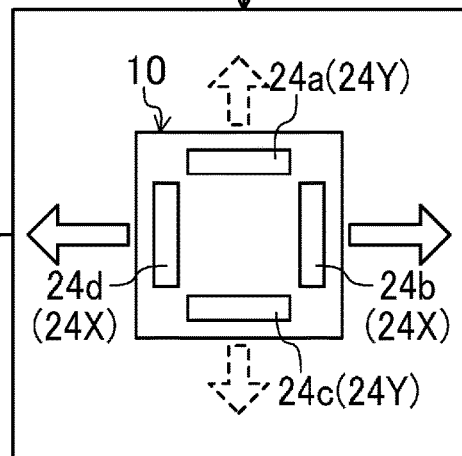

As shown in FIG. 11, an air current control operation is repeatedly performed in a basic blowout mode, a first blowout mode, and a second blowout mode in this order. In the example shown in FIG. 11, during one cycle for the air current control operation, an operation in each of the basic blowout mode, the first blowout mode, and the second blowout mode is performed once. The air current control operation may be repeatedly performed in the basic blowout mode, the second blowout mode, and the first blowout mode in this order.

[Second Variation of Air Current Control Operation]

Note that in the foregoing description, for example, the second and fourth main outlet openings (24b) and (24d) facing each other constitute the first openings (24X), and the remaining first and third main outlet openings (24a) and (24c) constitute the second openings (24Y). However, the first and second main outlet openings (24a) and (24b) adjacent to each other may constitute the first openings (24X), and the remaining third and fourth main outlet openings (24c) and (24d) may constitute the second openings (24Y). In this case, in the first blowout mode, currents of air through two (24a, 24b) of the four main outlet openings (24a-24b) constituting the first openings (24X) are blocked by the associated air current blocking mechanisms (50) to increase the velocity of air blown through two other ones (24c, 24d) of the four main outlet openings constituting the second openings (24Y). In the second blowout mode, currents of air through two (24c, 24d) of the four main outlet openings (24a-24b) constituting the second openings (24Y) are blocked by the associated air current blocking mechanisms (50) to increase the velocity of air blown through the remaining two main outlet openings (24a, 24b) constituting the first openings (24X).

[Third Variation of Air Current Control Operation]

Note that in the foregoing description, for example, the first wind direction fixing operation is performed together with the air current control operation in the first blowout mode, and the second wind direction fixing operation is performed together with the air current control operation in the second blowout mode. However, the indoor controller (90) may be configured such that the swing control operation is performed instead of the first and second wind direction fixing operations. In this case, the swing control operation is performed together with the operation in the first blowout mode and the operation in the second blowout mode.

As can be seen, performing the swing control operation together with the operation in the first blowout mode allows air (i.e., air cooled in the indoor heat exchanger (32)) to be blown through the first and third main outlet openings (24a) and (24c) constituting the second openings (24Y) toward the indoor space (500) at a higher flow velocity than in the basic blowout mode, and allows the direction of the blown air to shift (reciprocate) in the limited possible range (R2).

Likewise, performing the swing control operation together with the operation in the second blowout mode allows air (i.e., air cooled in the indoor heat exchanger (32)) to be blown through the second and fourth main outlet openings (24b) and (24d) constituting the first openings (24X) toward the indoor space (500) at a higher flow velocity than in the basic blowout mode, and allows the direction of the blown air to shift (reciprocate) in the limited possible range (R2).

[First Variation of High-Load Cooling Control]

Note that in the foregoing description, for example, the air current control operation is performed under the high-load cooling control. However, the indoor controller (90) may be configured such that under the high-load cooling control, the swing control operation is performed instead of the air current control operation. In this case, under the high-load cooling control, the indoor controller (90) performs the swing control operation to swing (reciprocate) the four wind direction adjusting slats (51) each provided at an associated one of the four main outlet openings (24a-24d) so that the direction of air blown through each of the four main outlet openings (24a-24d) shifts in the limited possible range (R2).

The foregoing configuration also allows the swing control operation to be performed under the high-load cooling control (i.e., if the load of the indoor space (500) is higher than a predetermined value in the cooling operation). This can reduce the angle of the lowermost wind direction in a range where the direction of blown air swings, and can reduce the amount of variation in temperature among areas of the indoor space (500) and the load of the indoor space (500).

[Second Variation of High-Load Cooling Control]

Figure 12:
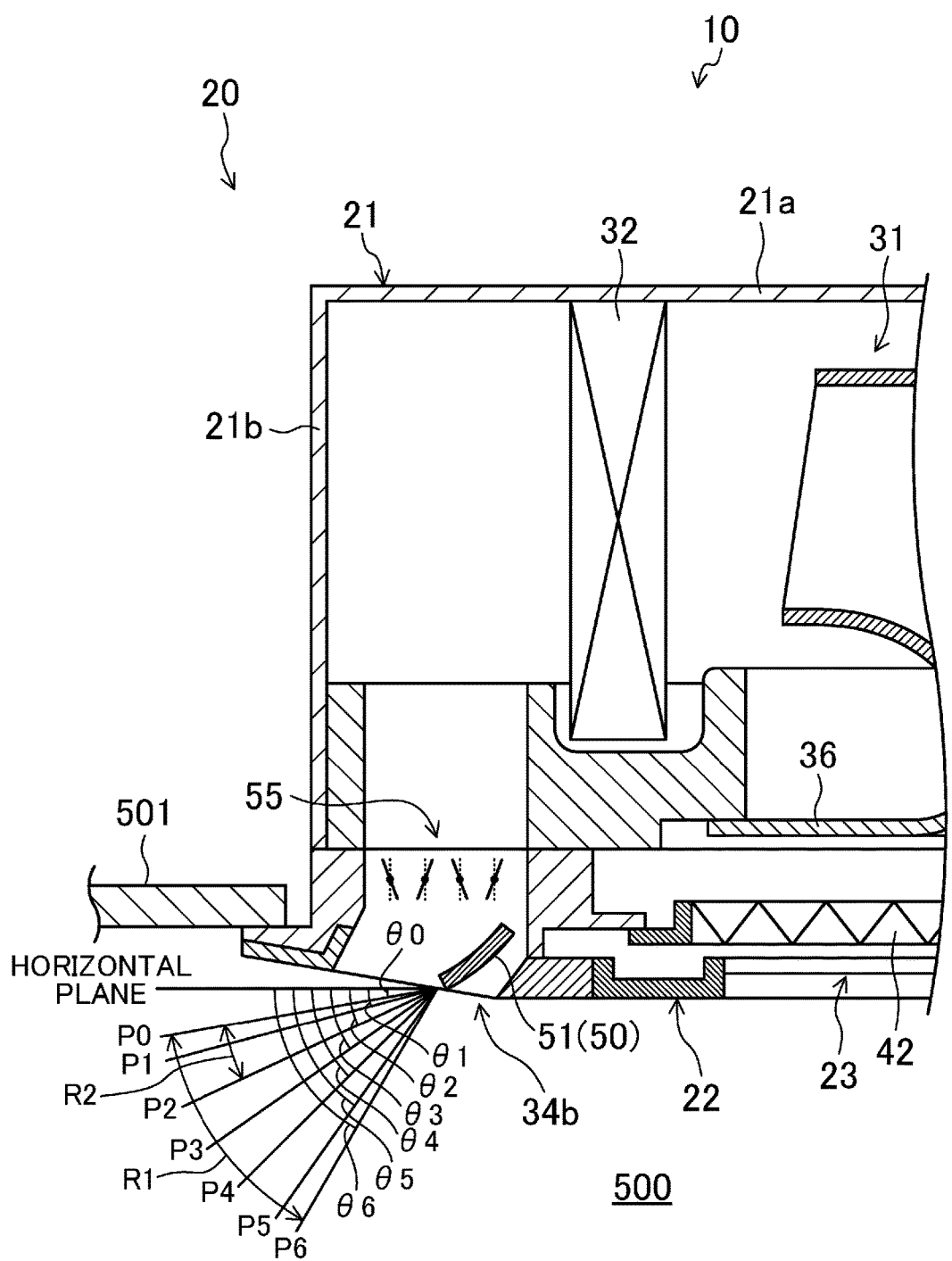
FIG. 12 is a schematic cross-sectional view for explaining an opening adjusting mechanism.

As shown in FIG. 12, opening adjusting mechanisms (55) may be provided at each of the main outlet openings (24a-24d). The opening adjusting mechanisms (55) are capable of adjusting the area of an associated one of the main outlet openings (24a-24d) (i.e., the cross-sectional area of a channel for blown air). For example, the opening adjusting mechanisms (55) are each configured as a shutter capable of adjusting its degree of opening.

In such a configuration, the indoor controller (90) may be configured to perform an opening control operation under the high-load cooling control. In the opening control operation, the indoor controller (90) controls the opening adjusting mechanisms (55) provided at at least one of the four main outlet openings (24a-24d) so that the area of the at least one of the four main outlet openings (24a-24d) is smaller than a normal opening area (the opening area previously determined to be the area of each of the main outlet openings (24a-24d) obtained if the load of the indoor space (500) is lower than the predetermined value) to increase the velocity of air blown through the at least one of the four main outlet openings (24a-24d).

As can be seen from the foregoing description, performing the opening control operation under the high-load cooling control (i.e., if the load of the indoor space (500) is higher than the predetermined value in the cooling operation) can increase the velocity of air blown through the main outlet openings (24a-24d) each having an area that is adjusted by the opening adjusting mechanisms (55) to be smaller than the normal opening area. This can facilitate blowing air through the main outlet openings (the main outlet openings (24a-24d) having an area smaller than the normal opening area) toward a distant location in a horizontal direction. This can increase the distance over which the blown air travels in the horizontal direction, thus distributing the blown air over a wide range of the indoor space (500). This can further reduce the amount of variation in temperature among areas of the indoor space (500) and the load of the indoor space (500).

[Third Variation of High-Load Cooling Control]

The indoor controller (90) may be configured to perform a fan control operation under the high-load cooling control. In the fan control operation, the indoor controller (90) controls the indoor fan (31) so that the velocity of blown air is higher than a normal air velocity (the air velocity previously determined to be the velocity of blown air obtained if the load of the indoor space (500) is lower than a predetermined value).

As can be seen from the foregoing description, performing the fan control operation under the high-load cooling control (i.e., if the load of the indoor space (500) is higher than the predetermined value in the cooling operation) can increase the velocity of blown air through the main outlet openings (24*a*-24*d*). This can increase the distance over which the blown air travels in the horizontal direction, thus distributing the blown air over a wide range of the indoor space (500). This can further reduce the amount of variation in temperature among areas of the indoor space (500) and the load of the indoor space (500).

[Load of Indoor Space]

Note that in the foregoing description, for example, the difference between the inlet temperature sensed by the inlet temperature sensor (81) and the predetermined target cooling temperature is handled as the load of the indoor space (500). However, a data value used as the load of the indoor space (500) should not be limited to this difference. For example, the indoor controller (90) may correct the inlet temperature sensed by the inlet temperature sensor (81) (e.g., add a predetermined value to the inlet temperature) in consideration of the possibility that air blown through the outlet (26) may be sucked into the inlet (23) without circulating through the indoor space (500), and may handle the difference between the corrected inlet temperature and the target cooling temperature as the load of the indoor space (500). Alternatively, the indoor controller (90) may determine the average of the inlet temperature sensed by the inlet temperature sensor (81) (or the corrected inlet temperature) and the floor temperature of the indoor space (500) sensed by a floor temperature sensor (not shown), and may handle the difference between the average and the target cooling temperature as the load of the indoor space (500).

Second Embodiment

An indoor unit (10) of an air conditioner according to a second embodiment includes an indoor controller (90) having a different configuration from that of the indoor unit (10) of the air conditioner according to the first embodiment. The configurations of the other components of the indoor unit (10) according to the second embodiment are similar to those of equivalent components of the indoor unit (10) according to the first embodiment.

<Indoor Controller>

In the second embodiment, the indoor controller (90) is capable of receiving a control instruction signal corresponding to a user's operation. For example, the indoor controller (90) is configured to communicate with a remote controller (not shown) provided in an indoor space (500) through wires or wirelessly. The remote controller is operated by a user, and is configured to send the control instruction signal corresponding to the user's operation (e.g., a button operation or a touch panel operation) to the indoor controller (90). Note that in the second embodiment, the indoor unit (10) does not have to include an inlet temperature sensor (81).

In the second embodiment, a control instruction signal for instructing the indoor controller (90) to perform a high-load cooling control (hereinafter referred to as the "high-load cooling control instruction signal") is sent to the indoor controller (90). The high-load cooling control instruction signal is sent to the indoor controller (90) if the user senses that the load of the indoor space (500) is relatively high. For example, if the user senses that the load of the indoor space (500) is relatively high, he or she operates the remote controller to send the high-load cooling control instruction signal (e.g., operates buttons or a touch panel to select a high-load cooling control mode). The remote controller sends the high-load cooling control instruction signal to the indoor controller (90) in response to the user's operation.

In the second embodiment, the indoor controller (90) is configured to perform a high-load cooling control when receiving the high-load cooling control instruction signal in a cooling operation. In this example, just like the first embodiment, the indoor controller (90) performs an air current control operation, a swing control operation, a first wind direction fixing operation, and a second wind direction fixing operation under the high-load cooling control. Specifically, the high-load cooling control instruction signal includes an air current control instruction signal for instructing the indoor controller (90) to perform an air current control operation, a swing control instruction signal for instructing the indoor controller (90) to perform a swing control operation (a swing control instruction signal for limiting an operation for swinging the direction of blown air), a first wind direction fixing instruction signal for instructing the indoor controller (90) to perform a first wind direction fixing operation, and a second wind direction fixing instruction signal for instructing the indoor controller (90) to perform a second wind direction fixing operation.

In the second embodiment, a normal possible range (R1) is previously determined to be the range where if a high-load cooling control instruction signal (i.e., a swing control instruction signal) is not received in the cooling operation, the direction of blown air can shift upward and downward. In this example, as shown in FIG. 6, the uppermost wind direction in the normal possible range (R1) is set to be the uppermost wind direction (P0), and the lowermost wind direction in the normal possible range (R1) is set to be the lowermost wind direction (P6).

The angle of the lowermost wind direction (relative to the horizontal plane) in a limited possible range (R2) is smaller than the angle of the lowermost wind direction (relative to the horizontal plane) in the normal possible range (R1). In this example, as shown in FIG. 6, the lowermost wind direction in the limited possible range (R2) is set to be a second wind direction (P2). Specifically, the angle of the lowermost wind direction in the limited possible range (R2) is set to be a wind direction angle (in this example, the second wind direction angle ($\theta 2$)) smaller than the angle of the lowermost wind direction in the normal possible range (R1) (in this example, the lowermost wind direction angle ($\theta 6$)). The uppermost wind direction in the limited possible range (R2) is set to be the uppermost wind direction (P0) (i.e., the direction of air blown horizontally). In other words, in this example, the limited possible range (R2) is narrower than the normal possible range (R1).

Advantages of Second Embodiment

As can be seen from the foregoing description, if the high-load cooling control instruction signal (i.e., the swing control instruction signal) is received, the swing control operation is performed. This can reduce the angle of the lowermost wind direction (relative to a horizontal plane) in a range where the direction of blown air swings (the range where the direction of blown air shifts upward and downward). Specifically, the angle of the lowermost wind direction in the range where the direction of blown air swings can be set to be the lowermost wind direction angle in a limited possible range (R2) (in this example, the wind direction angle (θ2)). This angle of the lowermost wind direction in the limited possible range (R2) is smaller than the angle of the lowermost wind direction in the normal possible range (R1) (in this example, the lowermost wind direction angle (θ6)). This can make it less likely for blown air to flow downward of the main outlet openings (24a-24d) than if the direction of blown air is shifted in the normal possible range (R1) during the cooling operation. This allows blown air to be distributed over the indoor space (500) to widely cool the indoor space (500). This can reduce the amount of variation in temperature among areas of the indoor space (500) and the load of the indoor space (500) in the cooling operation.

The variation of the air current blocking mechanism, the first variation of the air current control operation, the second variation of the air current control operation, the third variation of the air current control operation, the first variation of the high-load cooling control, the second variation of the high-load cooling control, and the third variation of the air current control operation, all described above, may be applied to the indoor unit (10) according to the second embodiment. However, the normal opening area during the opening control operation is equal to the opening area previously determined to be the area of each of the main outlet openings (24a-24d) obtained if a high-load cooling control instruction signal (i.e., an opening control instruction signal for instructing the indoor controller (90) to perform an opening control operation) is not received. The normal volume of air during the fan control operation is equal to the velocity of air previously determined to be the velocity of blown air obtained if a high-load cooling control instruction signal (i.e., a fan control instruction signal for instructing the indoor controller (90) to perform a fan control operation) is not received.

Other Embodiments

In the foregoing description, for example, the indoor unit (10) has four main outlet openings (24a-24d). However, the number of the main outlet openings should not be limited to four. For example, if the indoor unit (10) has two main outlet openings (first and second main outlet openings), the indoor controller (90) may perform, as an operation in a first blowout mode, an operation to block a current of air through the first main outlet opening with the air current blocking mechanism (50) to increase the velocity of air blown through the second main outlet opening, and may perform, as an operation in a second blowout mode, an operation to block a current of air through the second main outlet opening with the air current blocking mechanism (50) to increase the velocity of air blown through the first main outlet opening.

The number of the main outlet openings may be one. In this case, under the high-load cooling control, the indoor controller (90) may perform, as a swing control operation, an operation to control the wind direction adjusting slat (51) provided at the single main outlet opening so that the direction of air blown through the main outlet opening shifts (reciprocates) in the limited possible range (R2), without performing an air current control operation.

In the foregoing description, the indoor unit (10) is ceiling-mountable. However, the indoor unit (10) may be suspended from the ceiling, or may be wall-mountable.

The foregoing embodiments may be combined together as appropriate. Note that the foregoing description of the embodiment is a merely preferred example in nature, and is not intended to limit the scope, application, or uses of the present disclosure.

INDUSTRIAL APPLICABILITY

As can be seen from the foregoing description, the air conditioner indoor unit described above is useful as an air conditioner indoor unit blowing air into an indoor space.

DESCRIPTION OF REFERENCE CHARACTERS

10 Indoor Unit
20 Casing
24a First Main Outlet Opening (Outlet Opening)
24b Second Main Outlet Opening (Outlet Opening)
24c Third Main Outlet Opening (Outlet Opening)
24d Fourth Main Outlet Opening (Outlet Opening)
24X First Opening
24Y Second Opening
50 Air Current Blocking Mechanism
51 Wind Direction Adjusting Slat
55 Opening Adjusting Mechanism
90 Indoor Controller (Controller)
500 Indoor Space
501 Ceiling

The invention claimed is:

1. An air conditioner indoor unit blowing air into an indoor space, the unit comprising:
a casing having at least one outlet opening;
a wind direction adjusting slat provided at the at least one outlet opening to shift a direction of blown air through the at least one outlet opening upward and downward; and
a controller configured to perform a swing control operation if a load of the indoor space is higher than a predetermined value in a cooling operation, the swing control operation being performed to swing the wind direction adjusting slat so that the direction of the blown air shifts in a limited possible range where an angle of a lowermost wind direction relative to a horizontal plane is smaller than an angle of a lowermost wind direction relative to the horizontal plane in a normal possible range, and to thereby increase a distance over which the blown air travels horizontally, the limited possible range being narrower than the normal possible range, the normal possible range being previously determined to be a range where if the load of the indoor space is lower than the predetermined value in the cooling operation, the direction of the blown air can shift upward and downward, wherein
in the swing control operation, the controller swings the wind direction adjusting slat so that during a swing cycle period that it takes for the direction of the blown air to reciprocate the limited possible range once, a period during which the direction of the blown air is located in an upper region of the limited possible range is longer than a period during which the direction of the blown air is located in a lower region of the limited possible range.

2. The unit of claim 1, wherein
an uppermost wind direction in the limited possible range is set to be a direction of the blown air directed horizontally.

3. The unit of claim 1, wherein
the casing has the at least one outlet opening comprising a plurality of outlet openings,
the wind direction adjusting slat is provided at each of the outlet openings,
in the swing control operation, the controller swings the wind direction adjusting slats each provided at an associated one of the outlet openings so that the direction of the blown air through each of the main outlet openings shifts in the limited possible range.

4. The unit of claim 3, further comprising
an air current blocking mechanism provided at each of the outlet openings to block a current of air through the outlet opening, wherein
the controller performs an air current control operation if the load of the indoor space is higher than the predetermined value in the cooling operation, the air current control operation being performed to control the air current blocking mechanisms so that a current of air through at least one of the outlet openings is blocked by the associated air current blocking mechanism to increase a velocity of the blown air through the remaining outlet opening.

5. The unit of claim 4, wherein
at least one of the outlet openings constitutes a first opening, the remaining outlet opening constitutes a second opening, and
in the air current control operation, the controller switches between a first blowout mode and a second blowout mode, an operation in the first blowout mode being performed to block a current of air through the first opening with an associated one of the air current blocking mechanisms to increase a velocity of blown air through the second opening, an operation in the second blowout mode being performed to block a current of air through the second opening with an associated one of the air current blocking mechanisms to increase a velocity of blown air through the first opening.

6. The unit of claim 5, wherein
in the air current control operation, the controller switches among the first blowout mode, the second blowout mode, and a basic blowout mode, and performs the swing control operation together with the operation in the basic blowout mode, an operation in the basic blowout mode being performed to supply air into the indoor space through the first and second openings.

7. The unit of claim 4, wherein
the wind direction adjusting slats are each capable of shifting to a position to block a current of air through an associated one of the outlet openings, and serve also as the air current blocking mechanisms.

8. The unit of claim 3, wherein
an opening adjusting mechanism is provided at each of the outlet openings to adjust an area of the outlet opening, and
the controller performs an opening control operation if the load of the indoor space is higher than the predetermined value in the cooling operation, the opening control operation being performed to control the opening adjusting mechanism provided at at least one of the outlet openings so that an area of the at least one of the outlet openings is smaller than a normal opening area to increase a velocity of blown air through the at least one of the outlet openings, the normal opening area being previously determined to be an area of the at least one of the outlet openings obtained if the load of the indoor space is lower than the predetermined value.

9. The unit of claim 1, further comprising
an indoor fan housed in the casing to generate a current of the blown air through the at least one outlet opening, wherein
the controller performs a fan control operation if the load of the indoor space is higher than the predetermined value in the cooling operation, the fan control operation being performed to control the indoor fan so that a velocity of the blown air is higher than a normal air velocity, the normal air velocity being previously determined to be a velocity of the blown air obtained if the load of the indoor space is lower than the predetermined value.

* * * * *